United States Patent [19]

Noguchi et al.

[11] Patent Number: 6,034,677
[45] Date of Patent: Mar. 7, 2000

[54] METHOD AND APPARATUS FOR DISPLAYING AN ELECTRONIC PROGRAM GUIDE

[75] Inventors: Fujio Noguchi, Cupertino; Kazuto Mugura, San Francisco; Takaaki Ota, San Diego, all of Calif.

[73] Assignees: Sony Corporation, Tokyo, Japan; Sony Electronics, Inc., Park Ridge, N.J.

[21] Appl. No.: 08/953,035

[22] Filed: Oct. 17, 1997

[51] Int. Cl.[7] .............................. H04N 5/445; H04N 5/50
[52] U.S. Cl. ........................... 345/327; 348/13; 348/566; 348/570; 348/731
[58] Field of Search .................................... 345/326, 327; 348/6, 10, 13, 553, 563, 564, 565, 566–569, 570–731; 455/3.1, 4.1, 4.2, 6.1, 6.2

[56] References Cited

U.S. PATENT DOCUMENTS

| | | | |
|---|---|---|---|
| 4,751,578 | 6/1988 | Reiter et al. .............................. | 358/183 |
| 4,855,833 | 8/1989 | Kageyama et al. ...................... | 358/183 |
| 5,040,067 | 8/1991 | Yamazaki ................................. | 358/183 |
| 5,179,641 | 1/1993 | Comins et al. .......................... | 395/132 |
| 5,223,924 | 6/1993 | Strubbe . | |
| 5,253,066 | 10/1993 | Vogel ....................................... | 358/188 |
| 5,283,561 | 2/1994 | Lumelsky et al. ....................... | 340/721 |
| 5,315,392 | 5/1994 | Ishikawa et al. ........................ | 348/570 |
| 5,317,403 | 5/1994 | Keenan ..................................... | 348/731 |
| 5,323,234 | 6/1994 | Kawasaki ..................................... | 348/6 |
| 5,353,121 | 10/1994 | Young et al. ............................ | 348/563 |
| 5,398,074 | 3/1995 | Duffield ................................... | 348/564 |
| 5,416,508 | 5/1995 | Sakuma et al. .............................. | 348/3 |
| 5,436,676 | 7/1995 | Pint et al. ................................. | 348/734 |
| 5,465,113 | 11/1995 | Gilboy ..................................... | 348/5.5 |
| 5,502,504 | 3/1996 | Marshall et al. ........................ | 348/565 |
| 5,512,955 | 4/1996 | Toyoshima et al. .................... | 348/569 |
| 5,523,796 | 6/1996 | Marshall et al. ........................ | 348/589 |
| 5,524,195 | 6/1996 | Clanton, III et al. ................... | 395/155 |
| 5,528,304 | 6/1996 | Cherrick et al. ........................ | 348/565 |
| 5,532,753 | 7/1996 | Buchner et al. ......................... | 348/569 |
| 5,532,754 | 7/1996 | Young et al. ............................ | 348/569 |
| 5,559,550 | 9/1996 | Mankovitz ..................................... | 348/6 |
| 5,585,866 | 12/1996 | Miller et al. ............................. | 348/731 |
| 5,589,892 | 12/1996 | Knee et al. ............................. | 348/731 |
| 5,594,509 | 1/1997 | Florin et al. ............................ | 348/731 |
| 5,596,373 | 1/1997 | White et al. ............................ | 348/569 |
| 5,621,456 | 4/1997 | Florin et al. ................................. | 348/7 |
| 5,671,411 | 9/1997 | Watts et al. ............................. | 395/615 |
| 5,703,795 | 12/1997 | Mankovitz .......................... | 364/514 R |
| 5,719,637 | 2/1998 | Ohkura .................................... | 348/564 |
| 5,731,844 | 3/1998 | Rauch et al. ............................ | 348/563 |
| 5,737,029 | 4/1998 | Ohkura .................................... | 348/564 |
| 5,745,909 | 4/1998 | Perlman et al. ......................... | 707/513 |
| 5,796,407 | 8/1998 | Rebiai et al. ............................ | 345/430 |
| 5,828,420 | 10/1998 | Marshall et al. ........................ | 348/564 |

*Primary Examiner*—John W. Miller
*Attorney, Agent, or Firm*—Blakey, Sokoloff, Taylor & Zafman LLP

[57] ABSTRACT

A method and apparatus for displaying programming information by translating the display of a broadcast of a program are provided. Programming information is displayed along with the program broadcast on the screen such that no portion of the broadcast is covered by the programming information. A multiple channel broadcasting system is tuned to a channel to provide a display of a broadcast of a program on a screen. Programming information is displayed that identifies channels in the broadcasting system. When displaying the programming information, the display of the program broadcast is translated to a smaller broadcast window on the screen by superimposing at least one of a series of successively smaller broadcast window outlines over the display of the broadcast on the screen. When removing the programming information from the display, the broadcast system translates the video of a broadcast of a program displayed in the smaller broadcast window to a larger broadcast window by superimposing at least one of a series of successively larger broadcast window outlines over the display device. The broadcast system then causes the display of the programming information to be removed from the display.

35 Claims, 29 Drawing Sheets

METHOD AND APPARATUS FOR DISPLAYING AN ELECTRONIC PROGRAM GUIDE

FIELD OF THE INVENTION

The present invention relates to the presentation of channel, program, and broadcast information for a multiple channel television broadcast system.

BACKGROUND OF THE INVENTION

Television broadcasting technology has improved tremendously since its inception. Today, television signals are broadcasted on the airwaves, through cables, and via satellite. The number of stations accessible today has increased to hundreds of stations. To select a program to view, many viewers simply "channel surf" until they find a channel that has a desirable program. Channel surfing refers to the process of using the channel "+" or "−" key to sequentially view each channel. Although some viewers find channel surfing among hundreds of stations enjoyable, most viewers prefer a more direct method for selecting a program to view.

Some prior art television channel selection guides provide a television channel selection guide which displays a listing of the channels typically in numeric order and the titles of the programs broadcasted or to be broadcasted on the channels. A simplified block diagram of such a guide is illustrated in FIG. 1. The viewer or user of the system may then select the channel by entering in the channel number or selecting a program. The system responds by removing the guide displayed and tuning to the station selected and displaying the broadcast signals of the station.

This system has a number of drawbacks. First, the guide provides only the title of the program. To get additional information, such as a written description of the program, the user must select an information button which responds by bringing up a second layer of the menu having the program description. Thus, as the number of stations increase, the efficiency of reviewing programs and program descriptions decreases.

Furthermore, many viewers prefer to preview an actual broadcast on a station before selecting that station for viewing. In the prior art systems, the user has to select each station to view, and subsequently go back to the channel guide in order to view program titles on other channels. While other prior art systems may provide a program listing having a transparent background superimposed over a program broadcast, it is still difficult to view the program broadcast through the program listing.

Moreover, in any television system a user can channel surf by skipping from channel to channel in sequence using the channel "up" or "down" buttons. However, when channel surfing in the prior art systems, the user is unable to take advantage of the channel listing and program description information. While some prior art television channel selection guides allow for channel surfing while the guide is displayed, these systems change the channel as the user moves a selection device or pointer to each new channel. Again this prevents taking full advantage of the broadcast system guide because, while the system guide provides program descriptions, a user might like to view a particular channel while surfing among the program descriptions of other channels.

Another shortcoming of prior art television channel selection guides is that, while providing the current time on the guide display, they do not provide a clear representation of the current time in relation to the channel program listings. Consequently, it is difficult for a user to ascertain the amount of time elapsed since a particular program began.

In the current generation of broadcasting technology, a viewer is provided with many options regarding programs that are available for broadcast. These options include, but are not limited to, on-demand selection of pay-per-view broadcasts, selection of a broadcast for automatic recording, and programming a broadcast system to tune to a preselected station at a designated time. As the number of options increases, so to does the need for a user-friendly system interface. The prior art channel selection guides do not provide a ready status indication as part of the channel selection guide. In addition, as the channel selection guides become more interactive and provide the viewer with more selections, the lack of status displays for system pointers and tuners can lead to a great deal of viewer frustration.

SUMMARY OF THE INVENTION

A method and apparatus for displaying programming information by translating the display of a broadcast of a program are provided. According to one aspect of the invention, a multiple channel broadcasting system is tuned to a channel to provide a display of a broadcast of a program on a screen. Programming information is displayed that identifies channels in the broadcasting system. When displaying the programming information, the display of the program broadcast is translated to a smaller broadcast window on the screen. The translation comprises two steps. One step superimposes at least one of a series of successively smaller broadcast window outlines over the display of the broadcast on the screen. Another step displays the broadcast in the smaller broadcast window. Therefore, the programming information is displayed along with the program broadcast on the screen such that no portion of the broadcast is covered by the programming information. Thus, a viewer has an unobstructed view of the selected program while simultaneously accessing the channel program selections of the programming information. The programming information includes an electronic program guide, a display information packet, an electronic category guide, and an electronic subcategory guide.

When removing the programming information from the display, the broadcast system translates the video of a broadcast of a program displayed in the smaller broadcast window to a larger broadcast window. This translation is accomplished by superimposing at least one of a series of successively larger broadcast window outlines over the display device. The broadcast system then causes the display of the programming information to be removed from the display. The broadcast system next displays the broadcast in the area of the largest broadcast window outline.

These and other features, aspects, and advantages of the present invention will be apparent from the accompanying drawings and from the detailed description and appended claims which follow.

BRIEF DESCRIPTION OF THE DRAWINGS

The objects, features, and advantages of the present invention will be apparent to one skilled in the art from the following detailed description in which.

DETAILED DESCRIPTION OF THE INVENTION

In the method and apparatus of the present invention the broadcast system described is a direct broadcast satellite system. However, it is readily apparent to one skilled in the art that other broadcast systems which have the capability of receiving and displaying a multiplicity of stations may utilize the method and apparatus of the present invention. Furthermore, in the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well known electrical structures and circuits are shown in block diagram form in order not to unnecessarily obscure the present invention.

Figure 1:
FIG. 1 is a simplified illustration of a prior art direct digital satellite system guide display.
Figure 2:
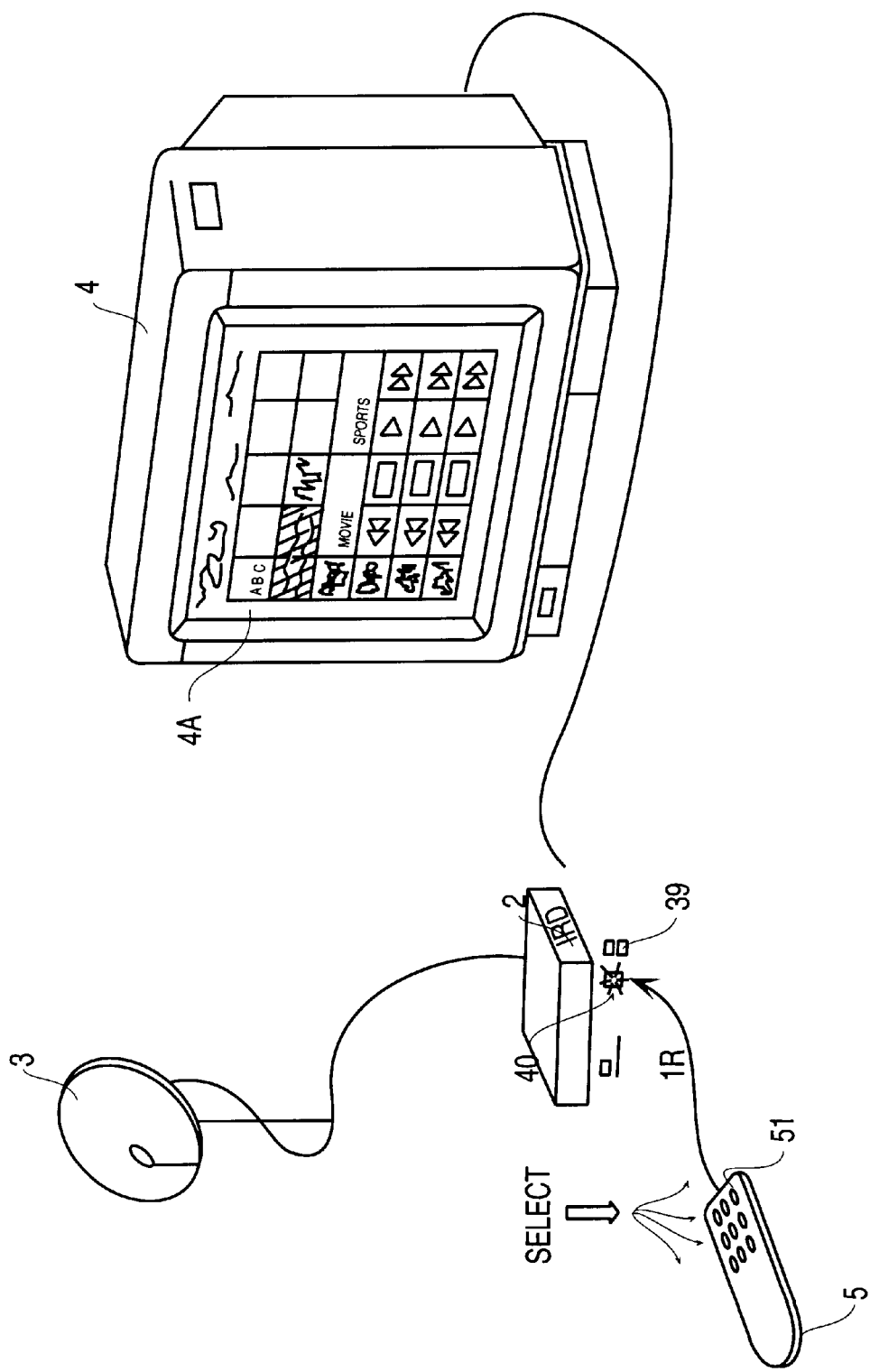
FIG. 2 is a simple illustration of one embodiment of the present invention.

FIG. 2 is a simplified diagram illustrating a Direct Satellite System (DSS). The system has an antenna 3, an integrated receiver/decoder 2 (IRD), a remote controller 5, and a monitor 4. Packets of data are transmitted by a transponder on the satellite. Each transponder transmits data in a time share manner at a predetermined frequency. A tuner 21 of a decoder is tuned in to the frequency of the transponder corresponding to a channel, which is designated by a viewer so that the packets of digital data are received by the decoder.

The antenna 3 receives an encoded data signal sent from a satellite. The received encoded signal is decoded by the IRD. The antenna 3 has a low noise block down converter 3a (LNB). The LNB 3a converts a frequency of a signal sent from the satellite to another frequency. The converted signal is supplied to the IRD 3. The monitor 4 receives a signal from the IRD 3.

Figure 3:
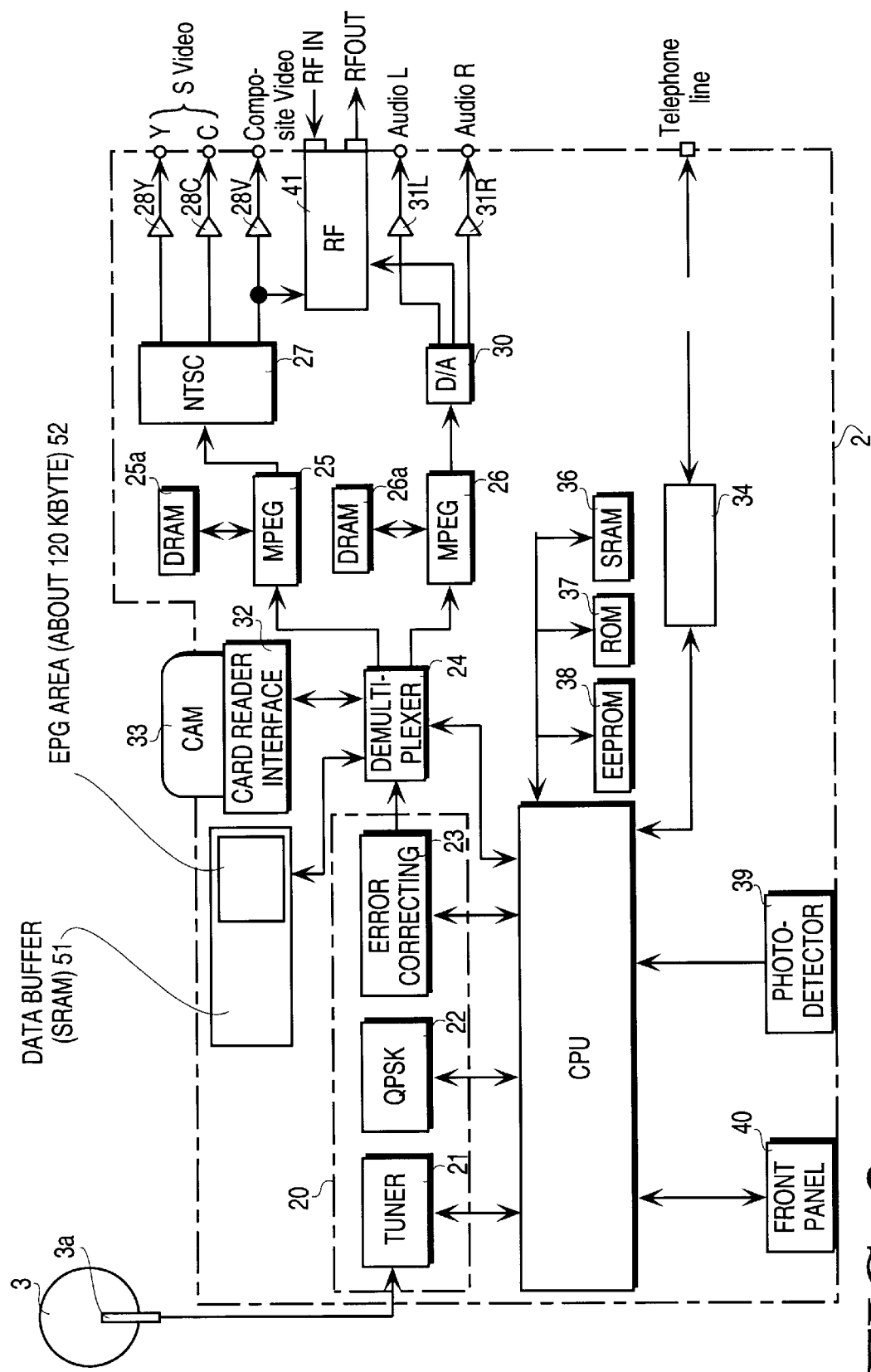
FIG. 3 is a block diagram representation of the elements utilized in the receiver of the television signals.

FIG. 3 is a block diagram of the IRD 3. A radio frequency (RF) signal output from the LNB 3a of the antenna 3 is supplied to a tuner 21 of a front end 20. The output from the tuner 21 is supplied to a quadrature phase shift keying (QPSK) demodulation circuit 22 for demodulation. The output from the QPSK demodulation circuit 22 is supplied to an error correcting circuit 23 for error correction. The data is received in encrypted and encoded (i.e., compressed) form.

The transport IC 24 receives the data stream, consisting of packets of data, from the error correcting circuit 23 and directs portions of the data stream to the appropriate circuit for processing. The digital data stream sent from a satellite includes headers for classifying the different portions of the data in the digital data stream. The transport IC stores the headers in registers and uses the headers to direct the data. The data stream sent from the satellite, includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Similarly, data having a header that identifies the data to be EPG data is transferred to a predetermined area in the data buffer 51 designated to store the EPG.

A conditional access module 33, includes a central processing unit (CPU), a read-only memory (ROM) and a random access memory (RAM). The conditional access module determines whether the user has the authorization to receive certain data, e.g., audio/video for a pay TV station, using the authorization information stored in its memory. Thus, if the conditional access module determines that the user is authorized access, a key to decrypt the incoming data is provided to the transport IC 24, which decrypts the data using the key provided. In one embodiment, a smart card is utilized. This card is inserted into the card reader interface 32 for interface to the transport IC 24. It is readily apparent to one skilled in the art that the conditional access module is not limited to smart cards and may be configured in other kinds of circuitry.

The MPEG video decoder 25 decodes the video signal received from the transport IC. Dynamic random access memory (DRAM) 25a, connected to the MPEG video decoder 25, is used for buffering and storage of video data during processing by the MPEG video decoder. The decoded digital video signal is supplied to a National Television System Committee (NTSC) encoder 27 and converted to a luminance signal (Y) and a chroma signal (C) which are respectively output through a buffer amplifier 28Y or 28C as an S video signal. A composite video signal is also output through a buffer amplifier 28V.

The MPEG audio decoder 26 decodes the digital audio signal. DRAM 26a, connected to the MPEG audio decoder 26, is used for buffering of data and information during processing by the MPEG audio decoder 26. The decoded digital audio signal is converted into an analog audio signal by D/A converter 30. The left audio signal is output through buffer amplifier 31L and the right audio signal is output through buffer amplifier 31R.

An RF modulator 41 mixes a composite signal output from the NTSC encoder 27 with an analog audio signal output from the D/A converter 30. The RF modulator 41 converts the mixed signal into an RF signal and outputs the RF signal therefrom.

The CPU 29 is the central control mechanism and executes code stored in the ROM 37 to perform certain functions of the system. For example, the CPU processes certain data to control the generation of the program list in accordance with the teachings of the present invention. In addition, the CPU receives and processes the user input, received from the front panel buttons or switches 40 and the photodetector circuit 39 to provide the user functionality and access to the system described herein. In addition, the CPU accesses user settings/preferences for processing of information and configuration of the system. The user settings are stored in the non-volatile memory, such as electrically erasable programmable read-only memory (EEPROM) 38. In addition, the CPU maintains a list of pointers, stored in static random access memory (SRAM) 36, to the channel information and program information stored in the SRAM 51. Thus, when a user wishes to display a form of the EPG on the screen, the CPU 29, accessing pointers stored in the SRAM 36, communicates to the transport IC 34 to retrieve the data from the data buffer (SRAM) 51 identified by the pointers. The CPU then formulates the format and other digital data which forms the guide or list on the screen and forwards the data representative of the guide/list to the transport IC 34 which forwards the data to the DRAM 25a of the MPEG video decoder 25 for subsequent output to the screen.

Figure 4:
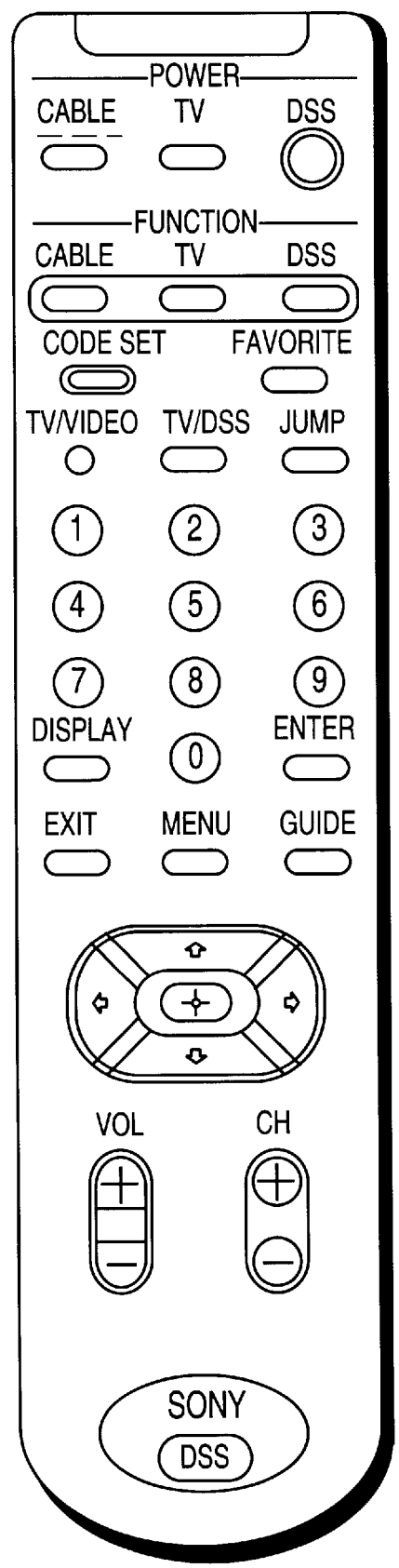
FIG. 4 is a representation of a remote control utilized to tune television stations in accordance with the teachings of the present invention.
Figure 5:
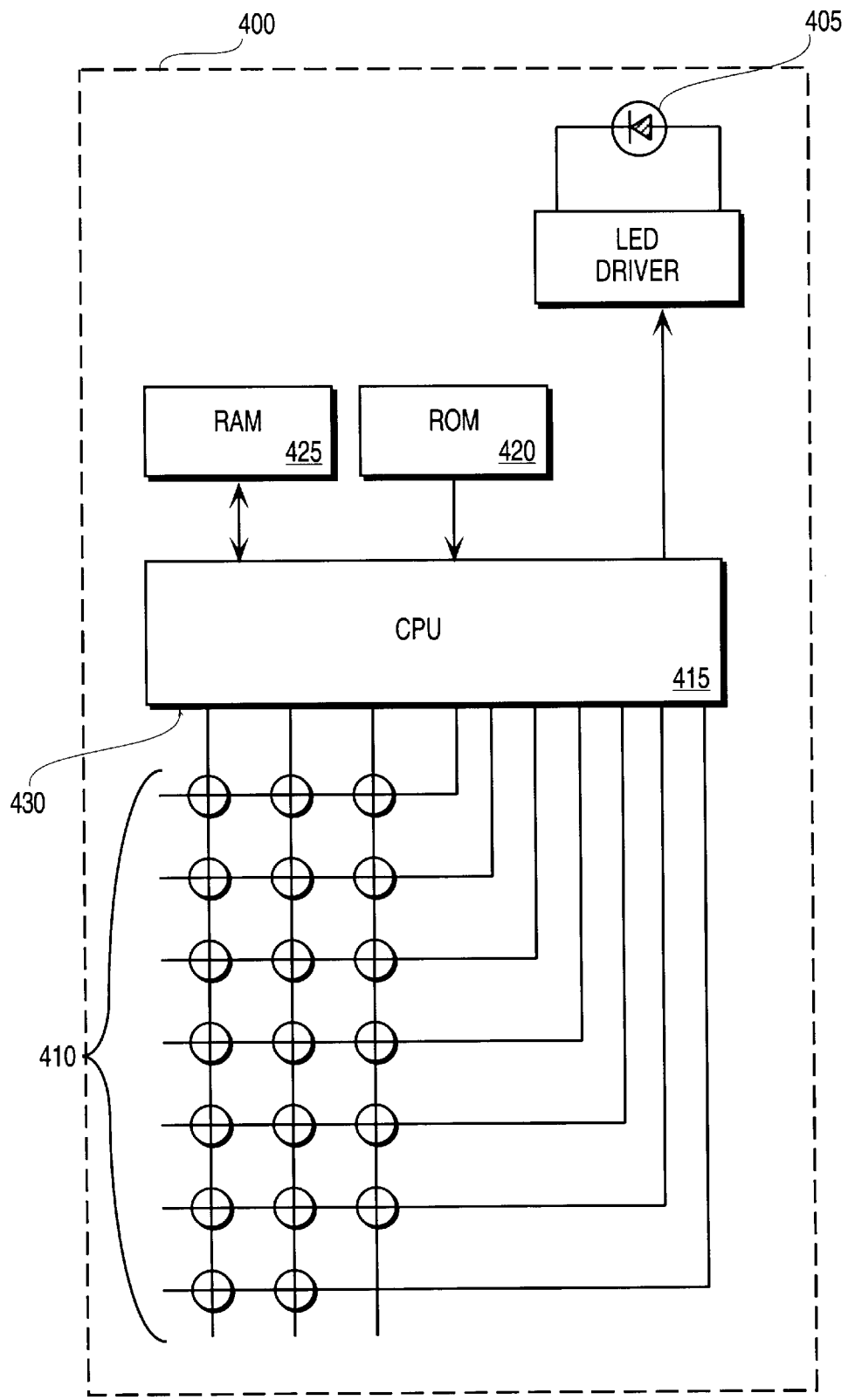
FIG. 5 is a simplified block diagram of the circuitry utilized in a remote control device.

FIG. 4 shows an example of a remote controller utilized by a user to transmit commands and make program selections in accordance with the teachings of the present invention. FIG. 5 is simplified a block diagram of the remote controller. The remote controller 400 has an infrared originating device 405, a set of operation buttons 410, a CPU 415, a ROM 420 and a RAM 425. The CPU 415 receives a signal sent from an operation button 410 through an input port 430. The signal is processed according to a program stored in the ROM 420. The RAM 425 is used as a working space so as to produce a transmitting code. The transmitting code is sent to the infrared originating device 405 through an output port and converted into an infrared signal. The infrared signal is transmitted to the IRD. The operation buttons 410 include a direction key for designating a pointer direction such as north, south, east and west, an "EPG" key, a "FAVORITE" key, a "SELECT KEY", a "MENU" key, an "EXIT" key, a ten-key numeric keypad and an "ENTER" key. The set of operation buttons 410 enable the user to select programs through the electronic programming guide in accordance with the teachings of the present invention.

Figure 6:
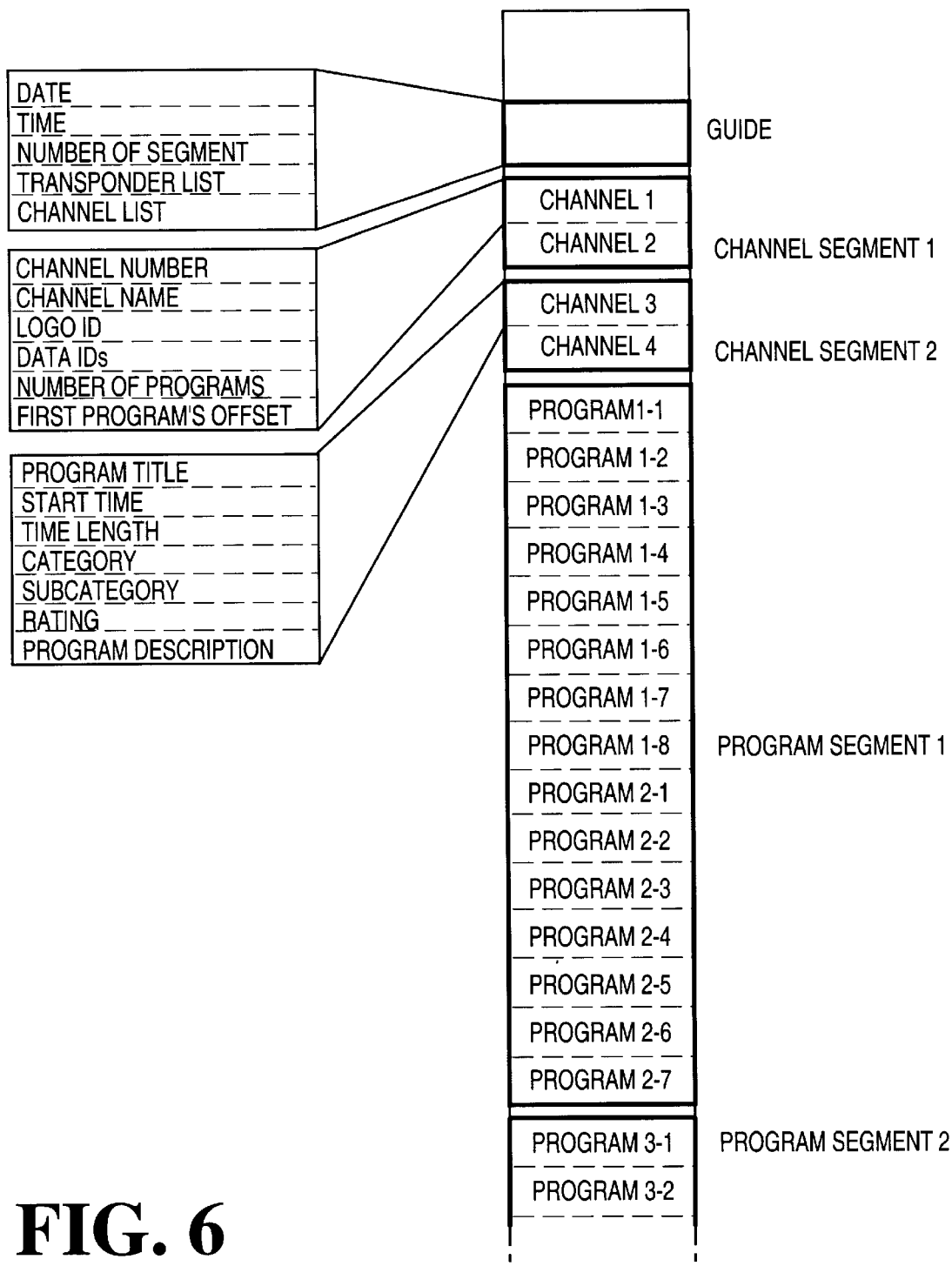
FIG. 6 illustrates the type of data utilized to present the electronic program guide in accordance with the teachings of the present invention.

FIG. 6 is a block diagram illustration of the data stored in a portion of the data buffer RAM 51. As noted above, the RAM 51 stores EPG data including guide data, channel data, and program data. General information is included in the guide data, for example, the current date and time. The transponder list identifies the number of the transponder transmitting a segment. The channel list identifies the channel number of the first channel of a portion of data. The channel data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined time frame, and first program offset which identifies the offset from the header to the first channel data in a segment.

The program data includes the program title, start time of the program, time length of the program, program category such as movies, news, sports, etc., program subcategory such as drama, horror, children's movies or baseball, basketball, football for the sports category, the movie rating and program description that provides a detailed description of the program.

Figure 7:
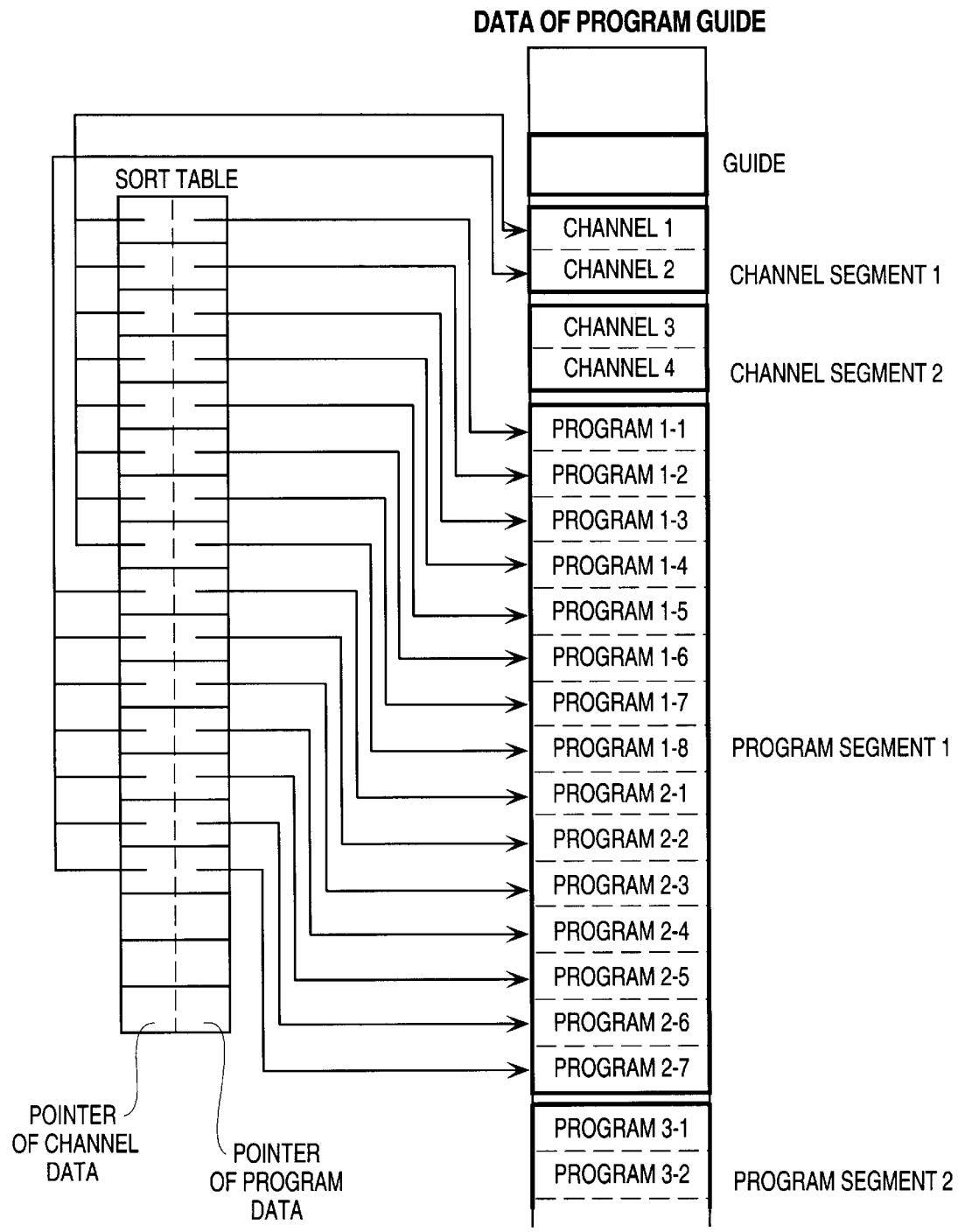
FIG. 7 illustrates the pointers to the data utilized to generate the electronic program guide in accordance with the teachings of the present invention.

FIG. 7 illustrates how pointers to the EPG data are sorted for display on a guide on the user's television screen. As noted above, EPG data includes guide data, channel data and program data which are stored in the Data Buffer (RAM) of the IRD (as shown in FIG. 3). When a viewer selects a channel, the CPU of the system determines the packet containing the channel information and extracts the transponder number from the channel information. The system front end starts tuning in the frequency of the designated transponder so as to receive the data transmitting from that transponder. If a viewer does not select any channel, the last channel is designated.

As noted above, the CPU generates a table of pointers 736 to the EPG stored in the memory. The table 736 is used for changing the order of channels or programs according to the information to be presented in the guide to the user. The table 736 includes an entry for the address pointer to the corresponding channel data and an entry to the corresponding program data.

A table for generating display information is stored in the ROM 37. Certain data from the table is read out from the ROM 37 and stored in DRAM 25a. Preferably the data is stored in compressed form. Therefore, when a character is displayed on a screen, the compressed character array is decoded so as to generate the character to be displayed. The encoder references a dictionary which includes a set of words and frequently used portions of words and numbers corresponding to each word or portion of a word. The encoder encodes each word to each number by using the dictionary. The decoder references the same dictionary as the encoder to perform the decode function. Once decoded, each character of the decoded word includes a character code corresponding to an American Standard Code for Information Interchange (ASCII) code. Nonvolatile memory (e.g., EEPROM 38) has two tables. The first table contains character bitmaps in the different fonts available for each character. The second table identifies the address in the first table at which to extract the character bitmap. The address is determined according to the character code. The bit map image of the character is transmitted to DRAM 25a and subsequently accessed to display the character on the screen.

In one embodiment of the present invention, the channel data is received from a predetermined transponder and the channel number and channel name are stored in DRAM 25a. Additional channel information such as the channel logo is stored in the ROM 36. The ROM 36 preferably includes a table of Logo IDs and the address of Logo Data stored in ROM 36. Therefore, once a Logo ID is determined, the address of the Logo Data is determined, retrieved and stored in DRAM 25a.

The channel data provides the beginning address of the program data for a particular program. The actual location on the screen at which the program information is displayed is dependent upon the format of the guide. For example, in a time-based system, the location where the program title is displayed is determined by the start time and time length stored in the program data.

Figure 8:
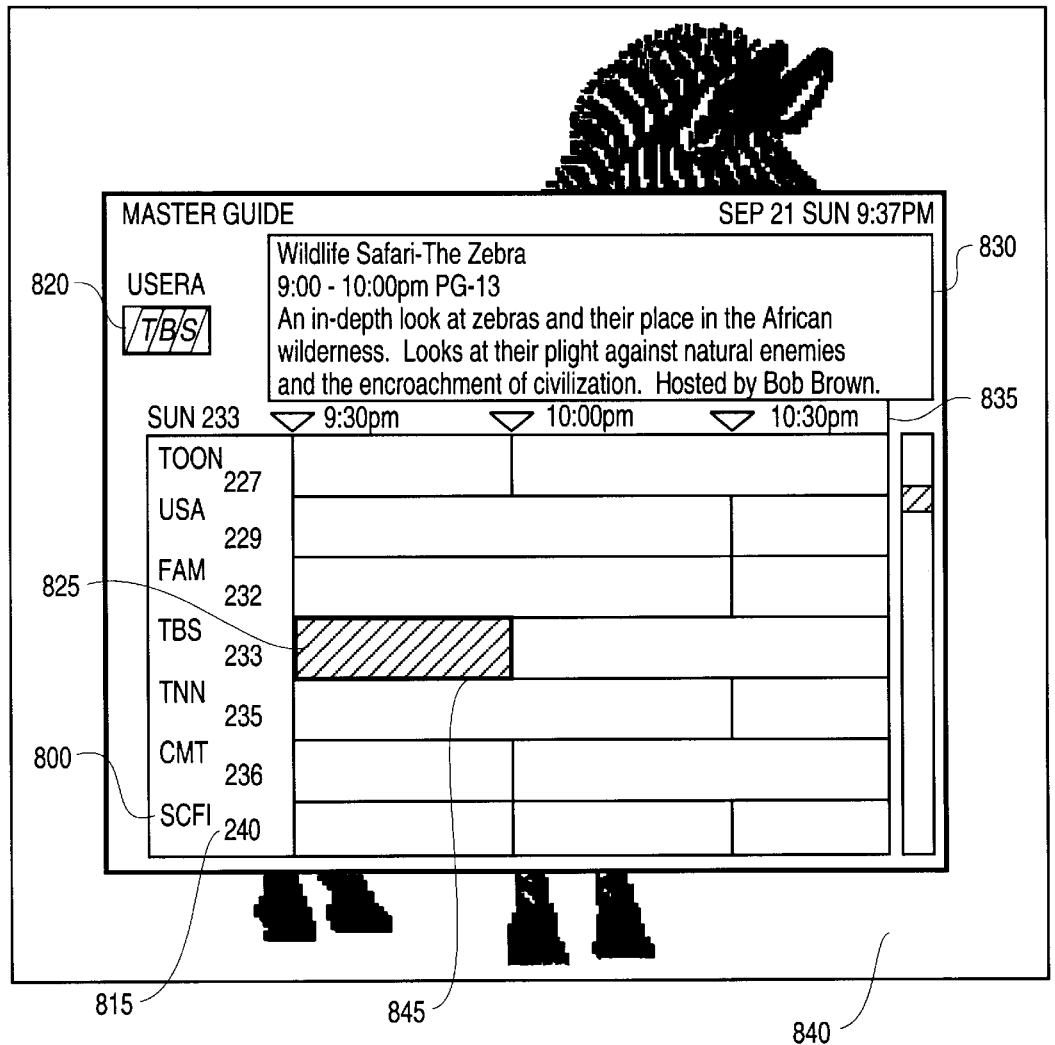
FIG. 8 illustrates the Master Guide presented to enable the viewer to view programming that is broadcast and is to be broadcast.

Using this information downloaded from the satellite transmission, programming and channel selection information is provided to the viewer. In the system and method of one embodiment of the present invention, this information is provided to the user in an innovative manner in order to enable the viewer to easily determine and select stations or programs to be viewed. For example, FIG. 8 illustrates a Master Guide that provides such information as the channel call sign 810, channel number 815 in the system, the channel logo of the selected station 820, a highlight 825 indicating the location of the system pointer operable by the arrow direction buttons, a program description 830 for the program the system pointer is located at, as well as program time information 835.

Figure 9A:
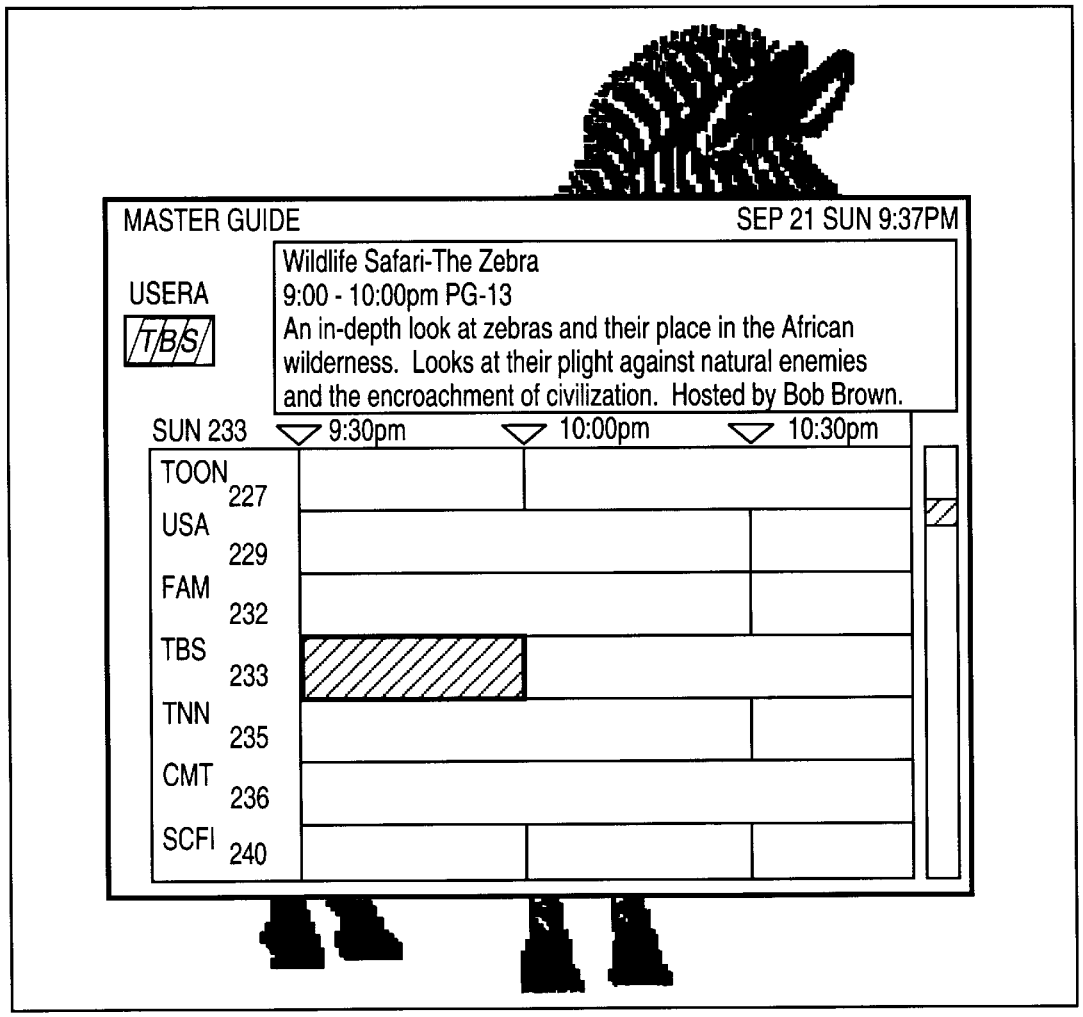
FIGS. 9A, 9B and 9C illustrate one embodiment of the present invention in which a broadcast audio and video is displayed behind the Master Guide.
Figure 9B:
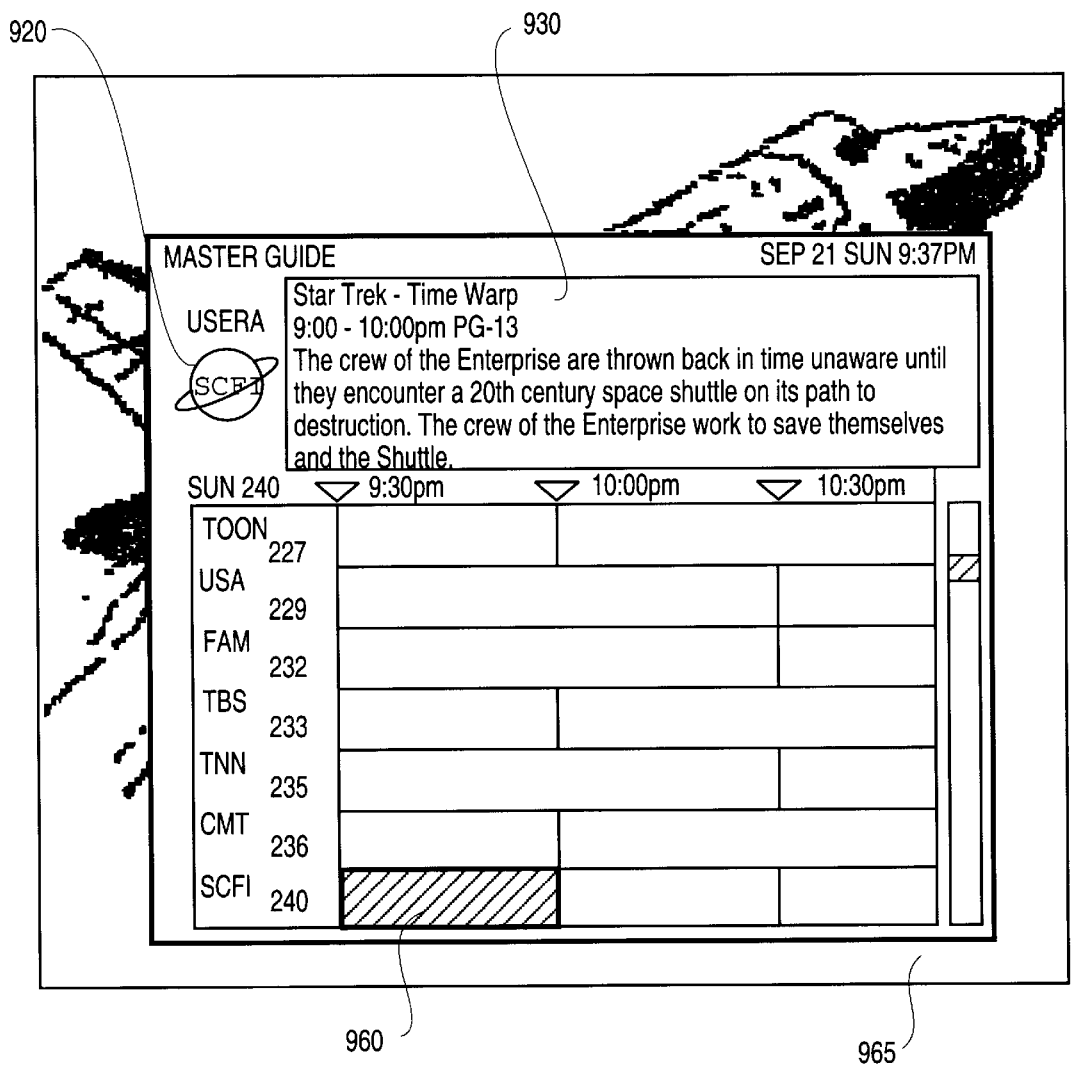
Figure 9C:
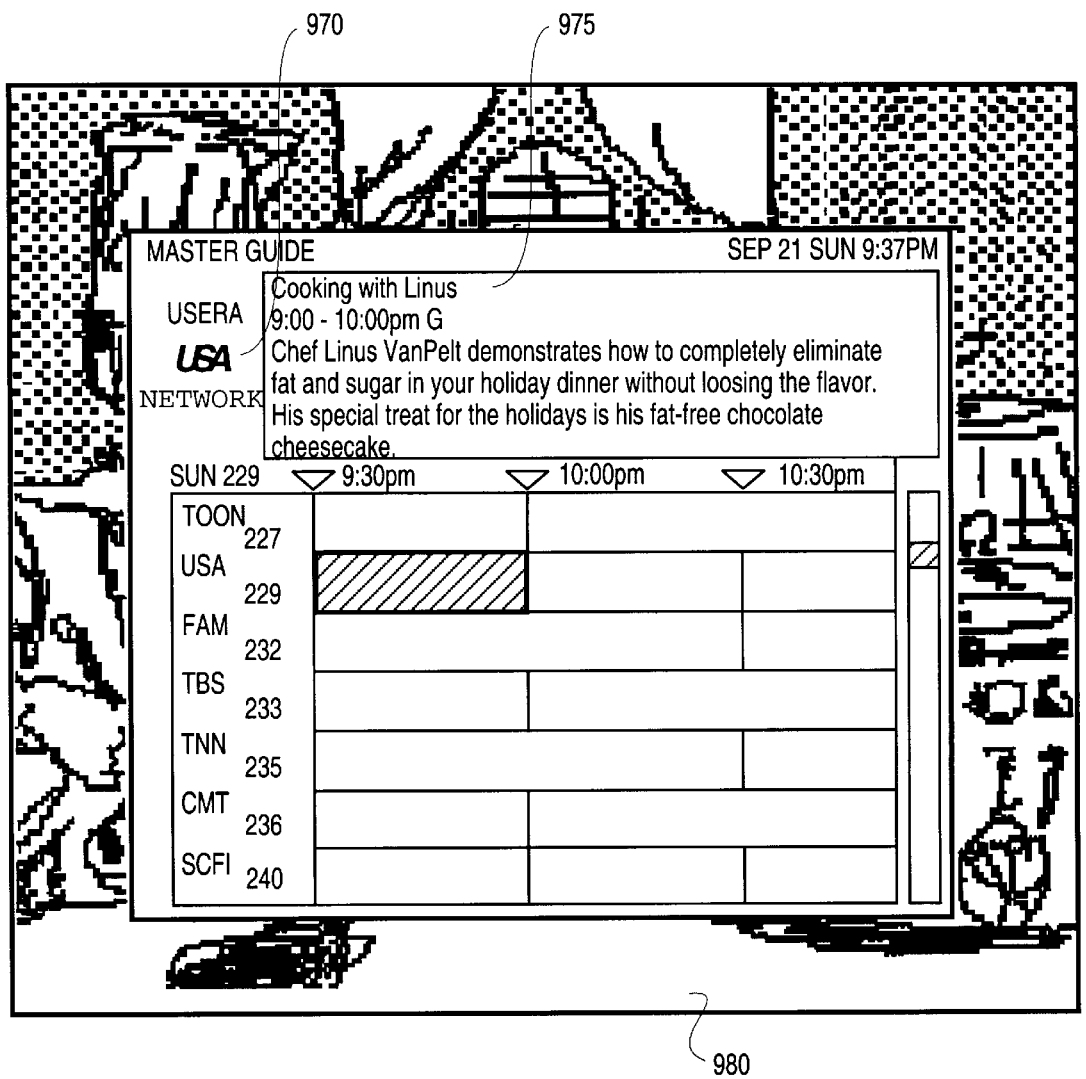

This guide is superimposed on the broadcast of channel 840 at which the system pointer is located. Thus, the user not only is provided the television system data showing the television channels, times of programming broadcasts and descriptions of programs, but is also provided the audio and video of one channel, all on the same menu level of the guide. By movement of the pointer 845 (in the present example, by manipulation of the information highlighted), the channel tuned to will change automatically, enabling the user to stay in the menu while still previewing in part the actual channel highlighted on the guide. This process is illustrated by FIGS. 9A, 9B, and 9C. The discussion will now turn to general process flows for an embodiment of the present invention.

It is readily apparent to one skilled in the art that additional functions can be added to the process and functions modified or removed and still be within the spirit and scope of the invention. The system provides an innovative and user friendly access to a wealth of information regarding programming available through the broadcasting system. In the present invention a number of functions are selectable through the remote control device. It is apparent that these functions may be selectable through other devices such as a joystick or other means such as an on screen menu.

Figure 10:
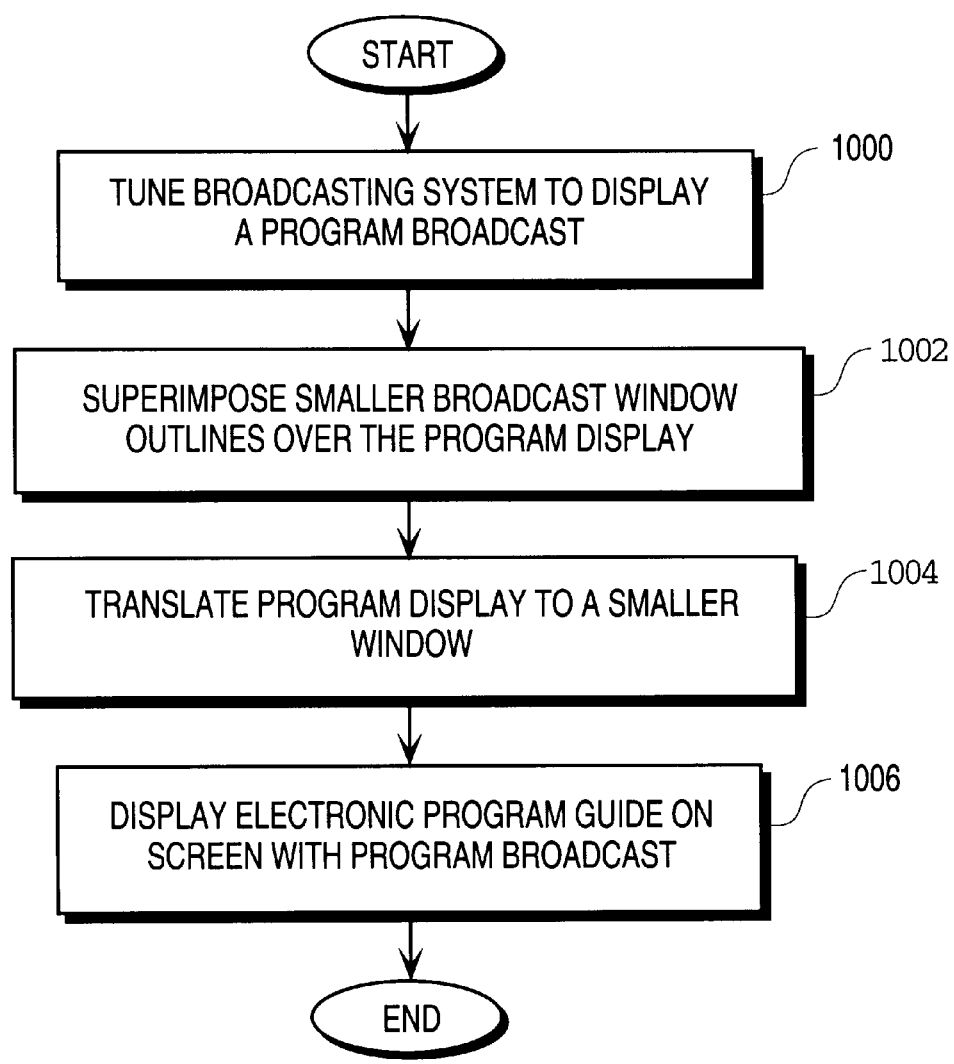
FIG. 10 is an exemplary flowchart illustrative of translating a display to a small window in one embodiment of the present invention.

FIG. 10 is an exemplary flowchart illustrative of translating a display to a small window in one embodiment of the present invention. The resizing process provides innovative feedback to the user while providing the broadcast system time to perform the computations necessary to resize the window. In the present embodiment, the broadcast display is translated to a small window when the user selects to display the electronic program guide. Thus both the broadcast and the electronic program guide are displayed without overlap. It is readily apparent that the window resizing process can be used to resize windows for a variety of purposes.

Figure 11:
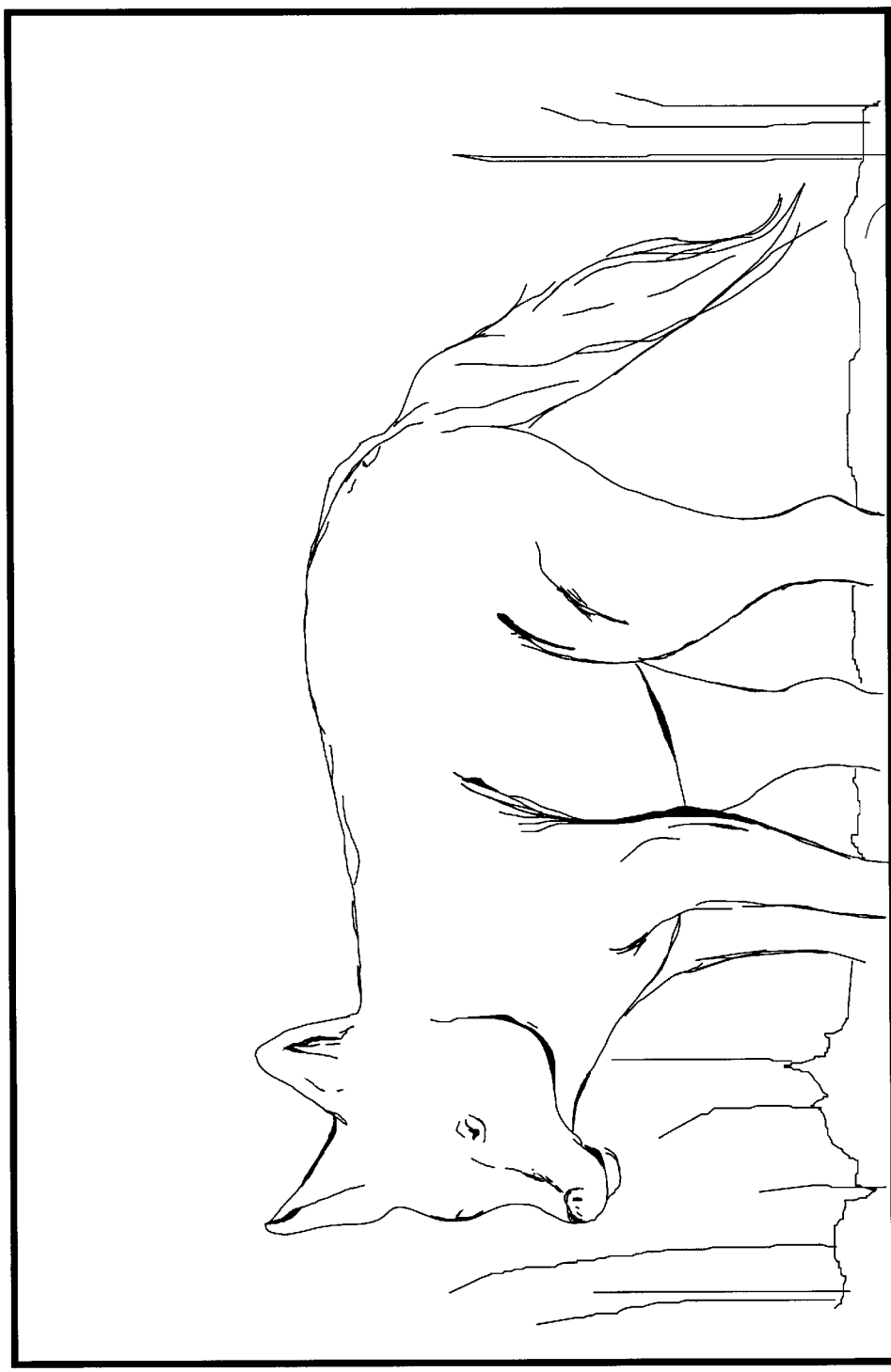
FIG. 11 illustrates a broadcast display in one embodiment of the present invention.
Figure 12:
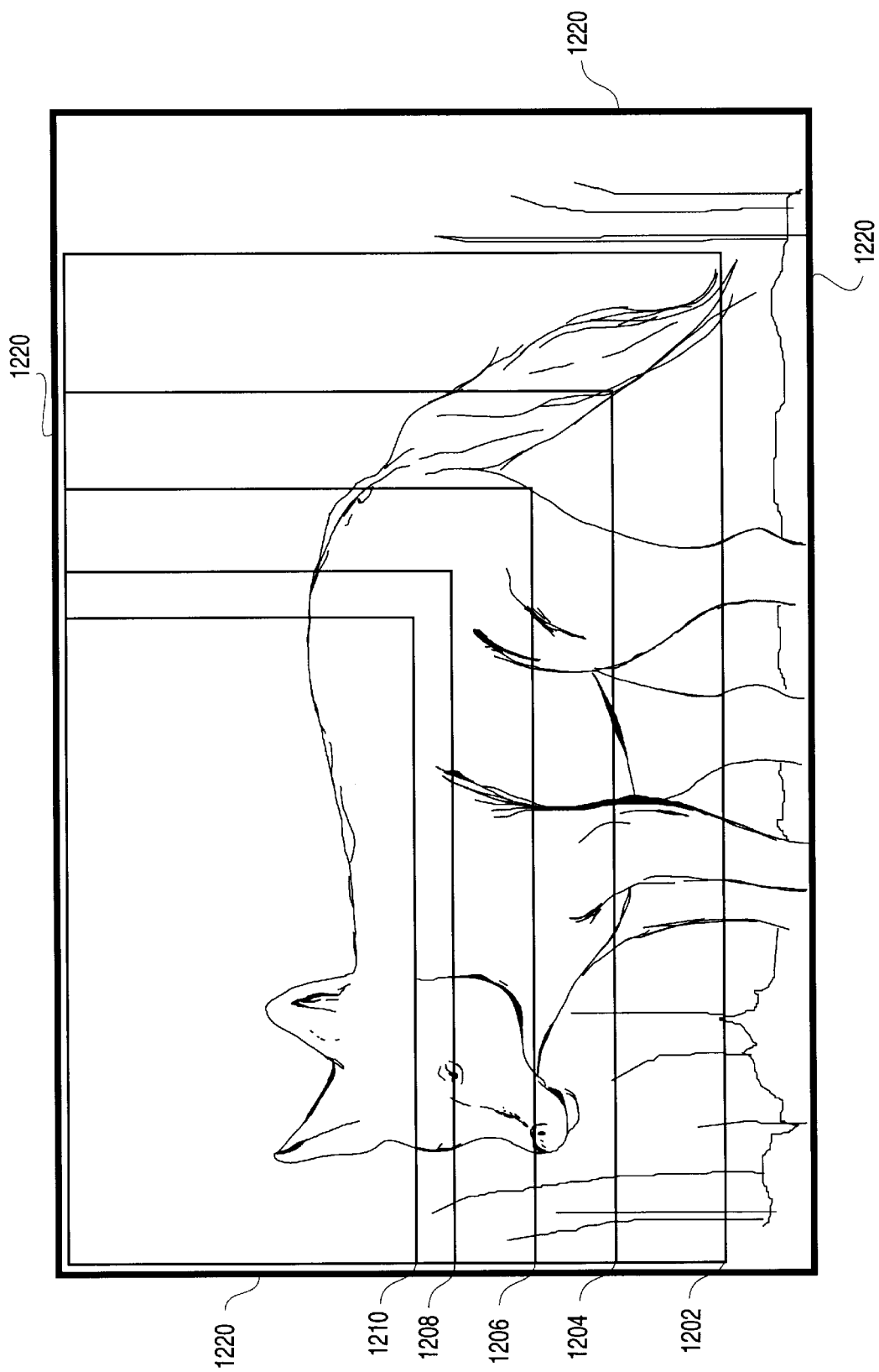
FIG. 12 illustrates superimposing successively smaller broadcast window outlines over a broadcast display in the translation of the broadcast window in one embodiment of the present invention.

Referring to FIG. 10, operation begins at Block 1000, at which a broadcasting system is tuned to a channel to provide a display of a broadcast of a program. The broadcast window corresponds to the entire display. FIG. 11 illustrates a broadcast display 1102 in one embodiment of the present invention. It is readily apparent that the window size need not initially correspond to the entire display but can be some portion of the display. Operation continues at Block 1002, at which a series of successively smaller broadcast window outlines are superimposed over the program display when it is desirable to translate to a smaller window. FIG. 12 illustrates superimposing these successfully smaller broadcast window outlines 1202–1210 over a broadcast display 1201 in the translation of a broadcast window in one embodiment of the present invention. With reference to FIG. 12, outline 1202 is displayed first, followed by outlines 1204, 1206, 1208, and 1210, respectively. Preferably, outline 1202 is shorter in length and narrower in width than the screen perimeter 1220, although it is contemplated that the outlines can progress in one dimension. Each of outlines 1204, 1206, 1208, and 1210 is shorter in length and narrower in width than the preceding outline, respectively.

Referring again to FIG. 10, operation continues at Block 1004, at which the program display is translated to a smaller broadcast window. Preferably the size of the broadcast window is not changed until the size of the smallest superimposed broadcast window outline equals a predetermined smallest broadcast window size. In an alternate embodiment, the size of the broadcast window changes as the size of the outline changes.

Operation continues at Block 1006, at which programming information in the form of an electronic program guide is displayed on the screen with the broadcast on the screen such that no portion of the broadcast is covered by the electronic program guide. In an alternate embodiment, programming information is displayed performed prior to the translation of the program broadcast.

Figure 13:
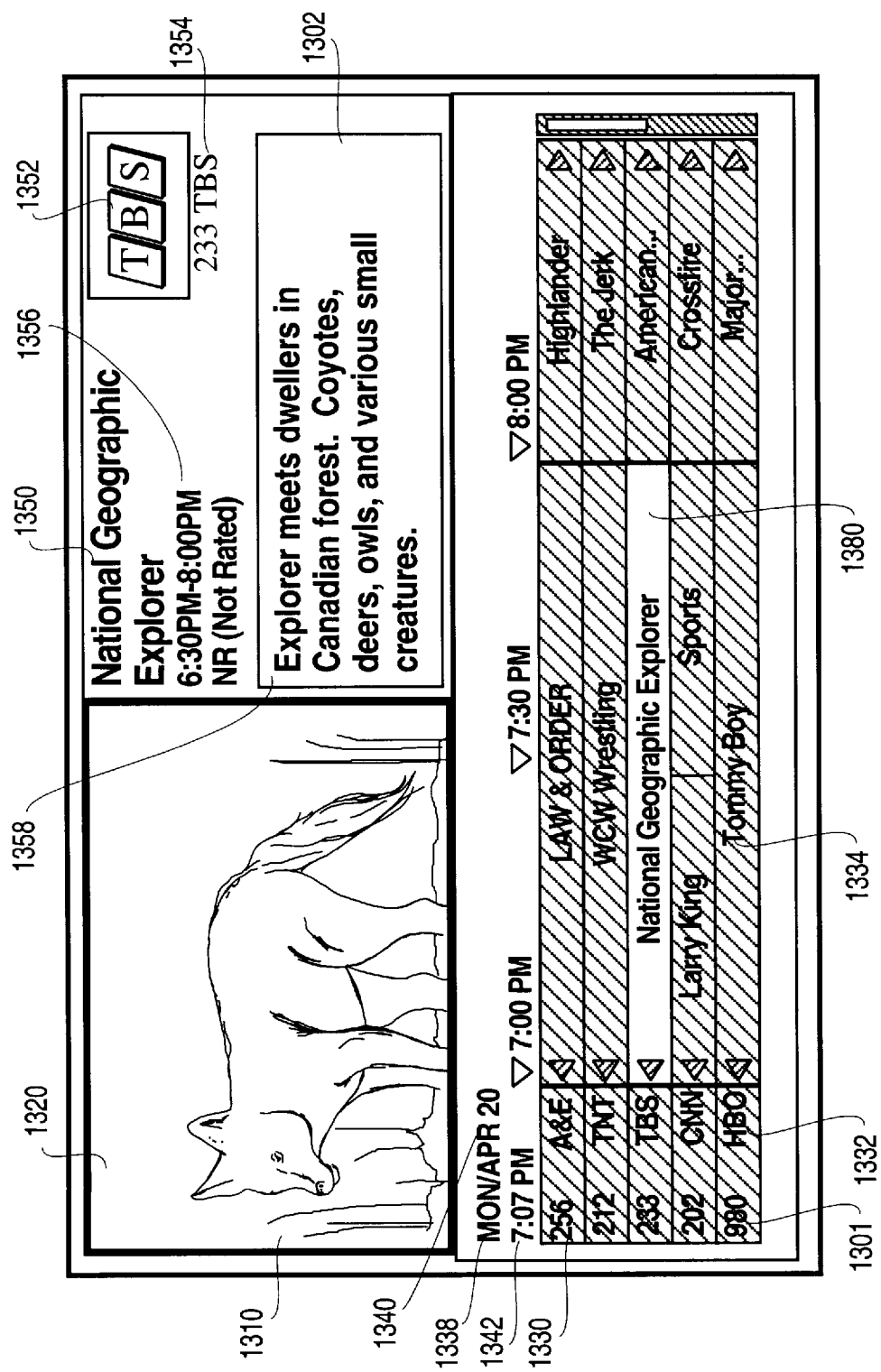
FIG. 13 illustrates the display of an electronic program guide along with a program broadcast on a screen in one embodiment of the present invention.

FIG. 13 illustrates one embodiment of a display of an electronic program guide 1301 with the program broadcast 1310 on a screen 1320. The electronic program guide 1301 includes the broadcast channel number 1330, the broadcast network identification 1332, the program title 1334, the start and end times for a program 1336, the current day 1338, the current date 1340, and the current time 1342. It is readily apparent that other embodiments of displays of electronic program guides presenting different information may be utilized.

Referring to FIG. 13, a user is able to readily view not only the broadcast audio and video, but also the electronic program guide of programming and the program description. A display information packet 1302 containing a description of the program broadcast may be displayed with the electronic program guide 1310. The display information packet 1302 also contains the program title 1350, the broadcast network identification 1352, the broadcast channel number 1354, the start and end times of the program 1356, and the program rating 1358. Alternatively, the user may selectively replace the display of the display information packet 1302 with the display of an electronic category guide. The electronic category guide contains a listing of programming categories.

After viewing the programming selections on the electronic program guide, a viewer may deselect the electronic program guide display. The electronic program guide display is also deselected upon selection of a channel by the user. Upon deselection of the electronic program guide, the broadcast system translates the broadcast of a program displayed in the small window by superimposing a series of successively larger broadcast window outlines over the display. In the present embodiment, the first larger broadcast window is longer in length and wider in width than the small window in which the program is displayed. Each successive outline is longer in length and wider in width than the preceding outline. Following the translation, the video broadcast is redisplayed in an area defined by each successively larger broadcast window outline.

Figure 14:
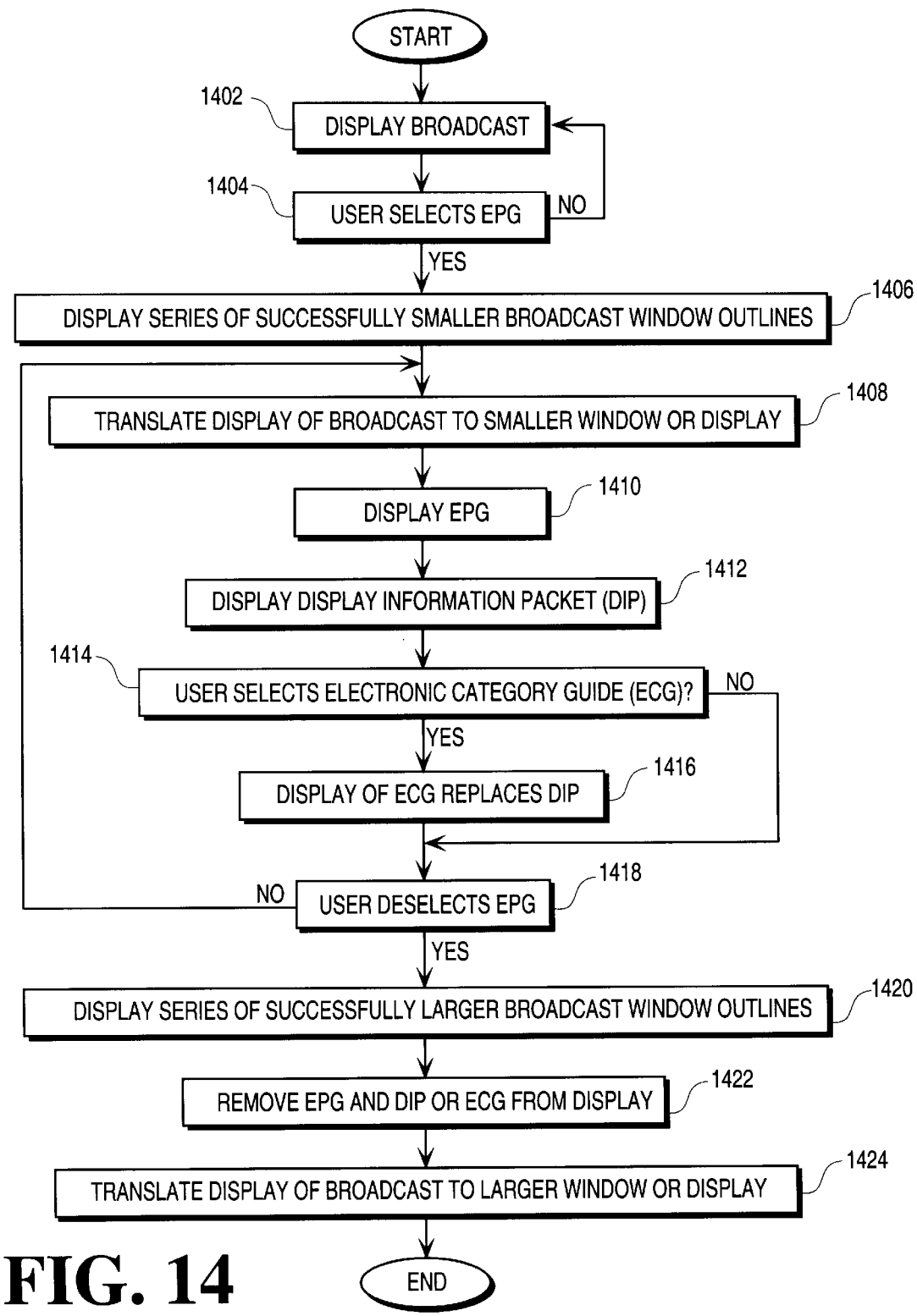
FIG. 14 is an exemplary flowchart that illustrates integrating the translation of a display to a small window with other functions of a broadcast system in one embodiment of the present invention.

FIG. 14 is an exemplary flowchart that illustrates one embodiment of the process for integrating the translation of a display to a small window with other functions of a broadcast system. Operation begins at Block 1402, at which a television screen or display is currently showing a broadcast of a selected station. Operation continues at Block 1404, at which a user may select the electronic program guide for display. The system monitors the states of the buttons on a user's remote control device to determine when the user has depressed a certain button. Implementation of monitoring, e.g., polling, interrupt driven events, are well known in the art and will not be discussed further herein. If the user does not select the electronic program guide for display operation continues at Block 1402, at which the system continues to display the broadcast and monitors selection by the user of the electronic program guide function. If the user does select the electronic program guide for display at Block 1404, then operation continues at Block 1406, at which a series of successfully smaller broadcast window outlines are displayed.

Operation continues at Block 1408, at which the display of a broadcast is translated to a smaller broadcast window on the display. Operation continues at Block 1410, at which an electronic program guide is displayed in an area adjacent to the smaller broadcast window. An exemplary electronic program guide was previously discussed with reference to FIG. 13. Operation continues at Block 1412, at which a display information packet is displayed along with the electronic program guide in an area adjacent to the broadcast window on the electronic program guide. The display information packet contains a description of the program that is currently selected. Operation continues at Block 1414, at which a user may select an electronic category guide for display using the buttons on the remote control. If the user selects the display of an electronic category guide, operation continues at Block 1416, at which the display of an electronic category guide replaces the display of the display information packet. The electronic category guide includes a number of programming categories. The broadcast system then identifies programs on channels that correspond to each category contained in the electronic category guide. The programs that correspond to the particular categories of the electronic category guide are then highlighted on the electronic program guide.

If the user does not select the electronic category guide for display, or following the display of the electronic category guide when the user selects the electronic category guide for display, operation continues at Block 1418, at which the user may deselect the display of the electronic program guide using the buttons on the remote control. If the user does not deselect the electronic program guide at Block 1418, operation continues at Block 1410, at which the broadcast system continues to display the electronic program guide. If the user does deselect the electronic program guide at Block 1418, operation continues at Block 1420, at which a series of successfully larger broadcast window outlines are displayed. Operation continues at Block 1422, at which the electronic program guide is removed from the display. If the electronic category guide was not selected by the user, then the display information packet is also removed from the display at Block 1422. If the electronic category guide was selected by the user, then the electronic category guide is also removed from the display at Block 1422. Operation continues at Block 1424, at which the display of the broadcast is translated to a larger window on the display screen.

Figure 15:
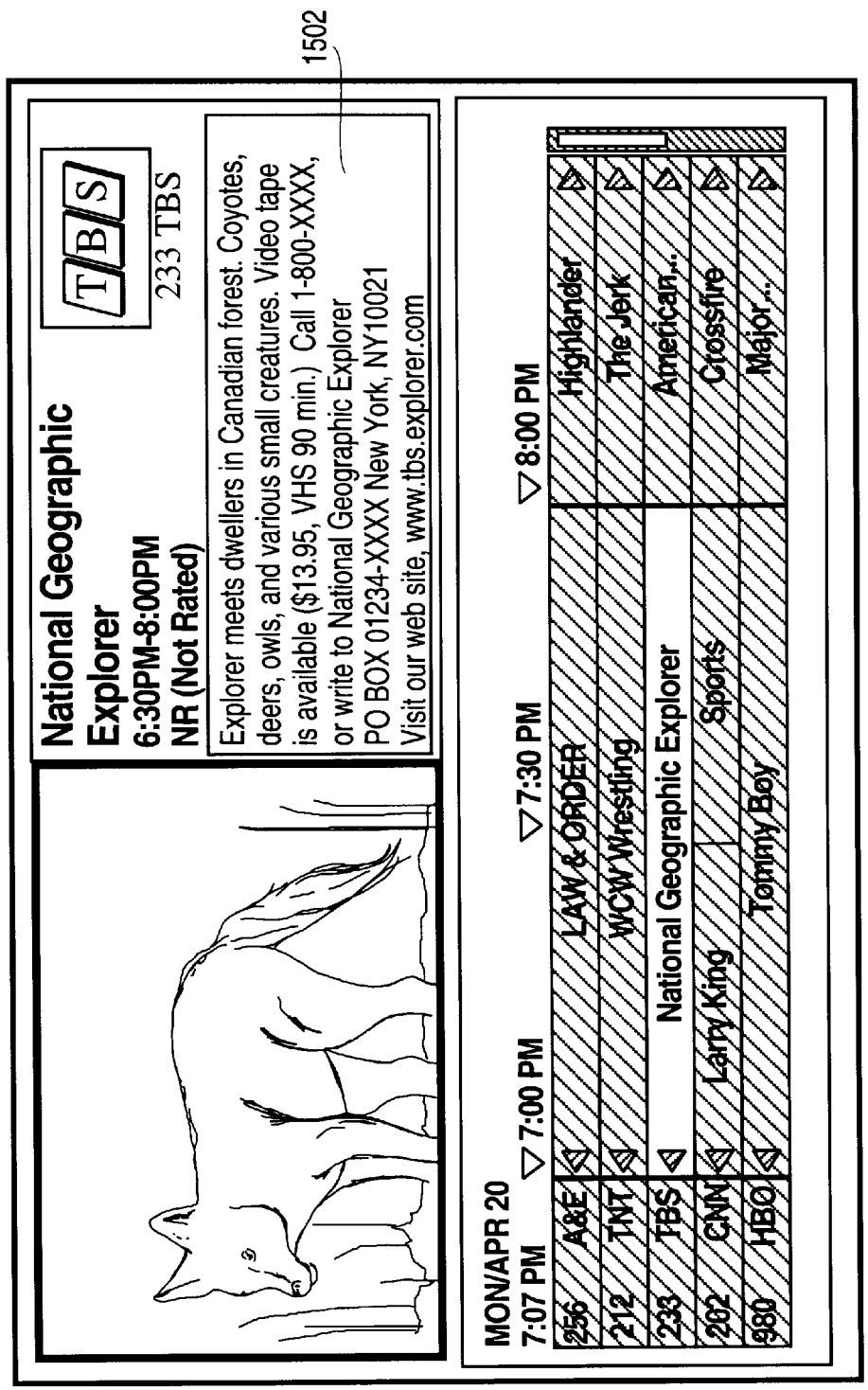
FIG. 15 illustrates the display of an electronic program guide in one embodiment of the present invention.

As noted earlier and referring again to FIG. 13, the user may select a display information packet for display along with the electronic program guide. In one embodiment, the display information packet contains a description of the program selected for display. Preferably, the system automatically resizes the text of the display information packet such that all the text appears in the window. FIG. 15 illustrates a display of an electronic program guide in one embodiment of the present invention that is displayed with a display information packet 1502 that contains a greater number of characters than the display information packet 1302 of FIG. 13. As the area allocated for the display information packet in one embodiment of the broadcasting system is of a constant fixed size, the broadcasting system is configured to adjust the font size of the characters based on the number of characters present for display. Optimization of the font size causes a maximum number of characters to be displayed for a given display area.

Figure 16:
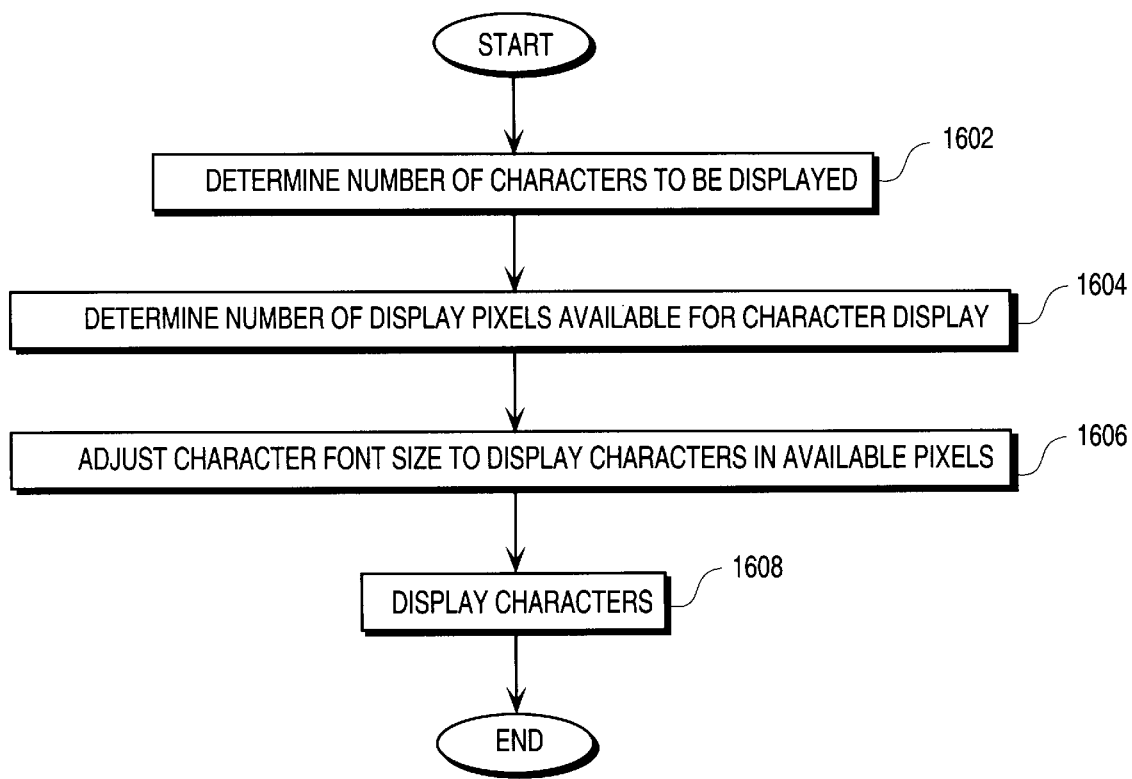
FIG. 16 is an exemplary flowchart illustrative of the process for optimizing the font size for an available display space in one embodiment of the present invention.

FIG. 16 is an exemplary flowchart illustrative of the process for optimizing the font size for an available display space in one embodiment of the present invention. Operation begins at Block 1602, at which the broadcast system determines a number of characters to be displayed. Operation continues at Block 1604, at which the broadcast system determines the number of display pixels available for character display. Operation continues at Block 1606, at which the broadcast system adjusts the character font size in order to display all characters in the available number of display pixels. Operation continues at Block 1608, at which the broadcasting system displays the characters in the display information packet.

Figure 17:
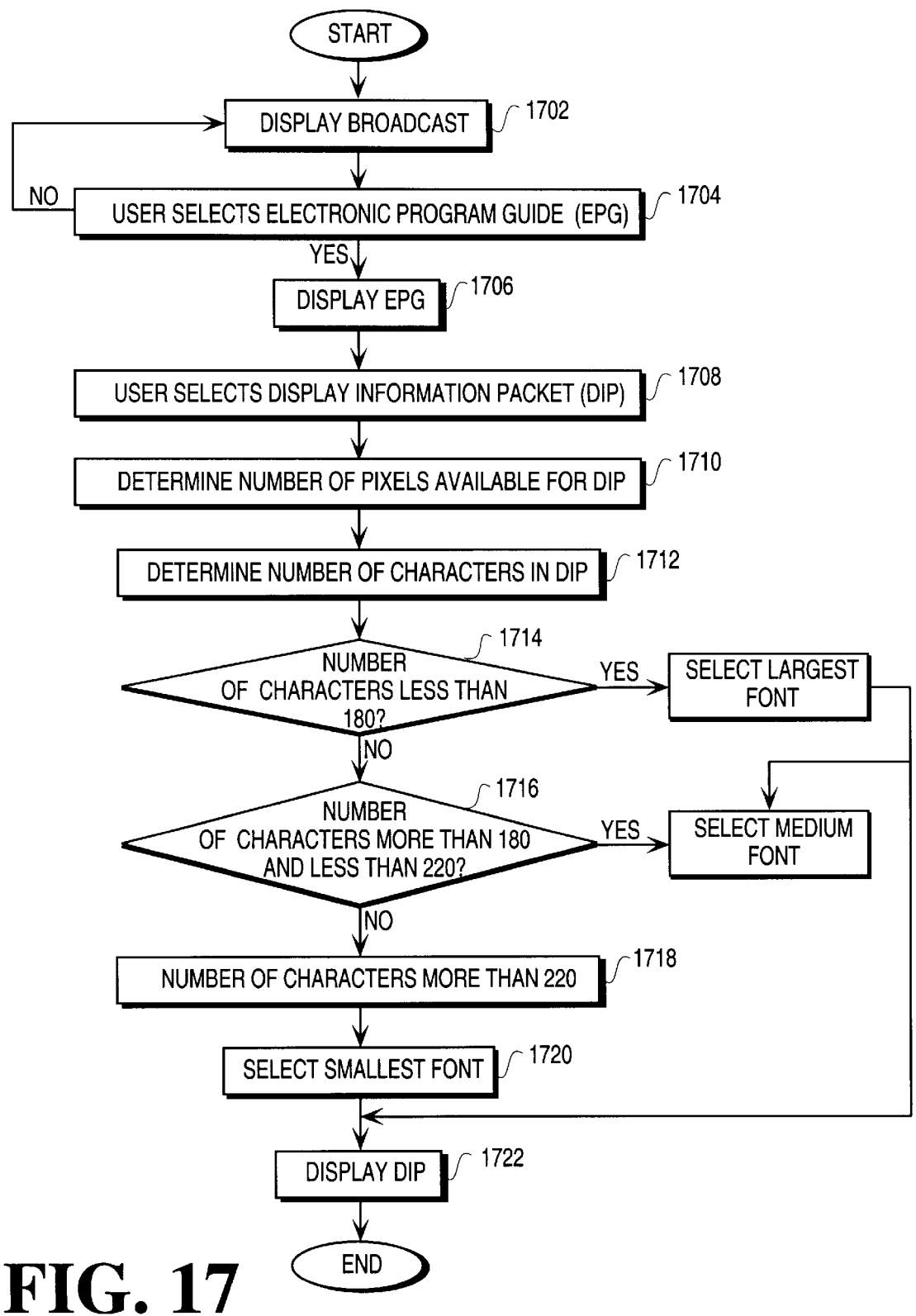
FIG. 17 is an exemplary flowchart illustrative of the process for integrating the process of optimization of the font size with other functions of a broadcast system in one embodiment of the present invention.

FIG. 17 is an exemplary flowchart illustrative of the process for integrating the process of optimization of the font size in the display information packet with other functions of a broadcast system in one embodiment of the present invention. Operation begins at Block 1702, at which a television screen or display is currently showing a broadcast of a selected station. Operation continues at Block 1704, at which a user may select a display of an electronic program guide. If the user does not select the electronic program guide for display, operation continues at Block 1702, at which the system continues to display the broadcast. If the user does select the display of an electronic program guide operation continues at Block 1706, at which the electronic program guide is displayed. Operation continues at Block 1708, at which a user selects a display information packet for display along with the electronic program guide.

Upon selection of the display information packet for display, operation continues at Block 1710, at which the broadcast system determines the number of pixels available for the display information packet. Operation continues at Block 1712, at which the broadcast system determines the number of characters in the display information packet that are to be displayed. In one embodiment, the maximum number of characters is 256. Operation continues at Block 1714, at which the broadcasting system determines if the number of characters is less than 180. One embodiment of the present invention uses three font sizes for the displaying characters in the display information packet. If the broadcast system determines at Block 1714 that the number of characters is less than 180, then the broadcast system selects the largest of the three font sizes. Following selection of the largest font size, operation continues at Block 1722, at which the broadcast system displays the display information packet using the largest font.

If the broadcast system determines at Block 1714 that the number of characters is not less than 180, then operation continues at Block 1716, at which the broadcasting system determines if the number of characters is greater than 180 and less then 220 characters. If the number of characters is greater than 180 and less than 220 then the broadcast system selects the medium font size. Following selection of the medium font size, operation continues at Block 1722, at which the broadcast system displays the display information packet using the medium sized font.

If the broadcast system determines at Block 1714 that the number of characters is not more than 180 and less than 220, then operation continues at Block 1718, at which the broadcast system determines that the number of characters is more than 220. Operation continues at Block 1720, at which the broadcast system selects the smallest of the three font sizes. Operation continues at Block 1722, at which the broadcast system displays the display information packet using the smallest font size.

Because the number of television broadcasting stations accessible today includes hundreds of stations, many viewers channel surf until they find a channel that has a desirable program. Channel surfing refers to the process of using the channel plus or minus key to sequentially view each channel. While some viewers find channel surfing among hundreds of stations enjoyable, some viewers prefer a more direct method of program selection. For this reason, an embodiment of the system of the present invention uses two modes, a non-channel surfing mode and a channel surfing mode, from which a user may select channels to view.

The non-channel surfing mode is described with reference to FIGS. 9A, 9B, and 9C. When the user selects the non-channel surfing mode, the broadcast system is first tuned to a channel 233 to provide a broadcast of a program on the screen or display 910. The user then selects a display of an electronic program guide 912 for identifying the channels available on the broadcast system and the programming available on the channels. A display information packet 916 is displayed along with the electronic program guide 912, and the display information packet 916 contains a description of the program to which the broadcast system is currently tuned. Furthermore, a system pointer 918 is displayed on the electronic program guide 912. The system pointer 918 is used to select a program for viewing by the user and, as such, may be manipulated by the user within the area of the electronic program guide 912. In the non-channel surfing mode the broadcast system is tuned to the channel that is pointed to by the system pointer 918. Furthermore, the display information packet 916 displays a program description for the program to which the broadcasting system is tuned. Therefore, when the user manipulates the system pointer to a different channel 229 and 240 in the non-channel surfing mode, the broadcast system tunes to that channel and displays the program 975 and 930 currently being broadcast on that channel, respectively.

Figure 18:
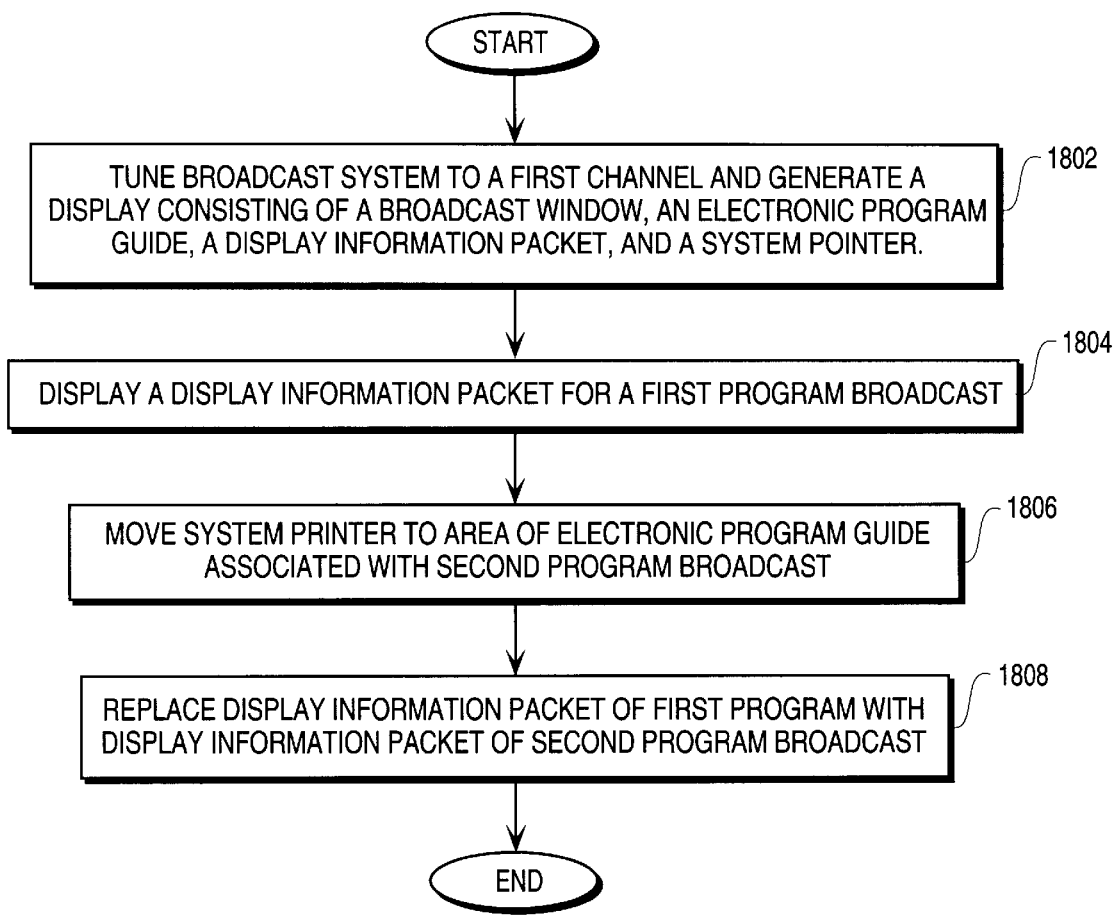
FIG. 18 is an exemplary flowchart illustrative of channel surfing in one embodiment of the present invention.

In contrast to the non-channel surfing mode, is the channel surfing mode of one embodiment of the present invention. FIG. 18 is an exemplary flowchart illustrative of the process of channel surfing in one embodiment of the present invention. At Block 1802, the broadcast system is tuned to a first channel and a display is generated consisting of a broadcast window, an electronic program guide, a display information packet, and a system pointer. A first program broadcast is displayed in the broadcast window. Operation continues at Block 1804, at which a display information packet is displayed for the first program broadcast. This display information packet contains a description of the first program broadcast. At Block 1806, the user moves the system pointer to an area of the electronic program guide associated with a second program broadcast. Operation continues at Block 1808, at which the broadcast system replaces the display information packet of the first program with a display information packet of a second program broadcast. The broadcast system remains tuned to the first program broadcast and continues to display the first program broadcast.

Figure 19:
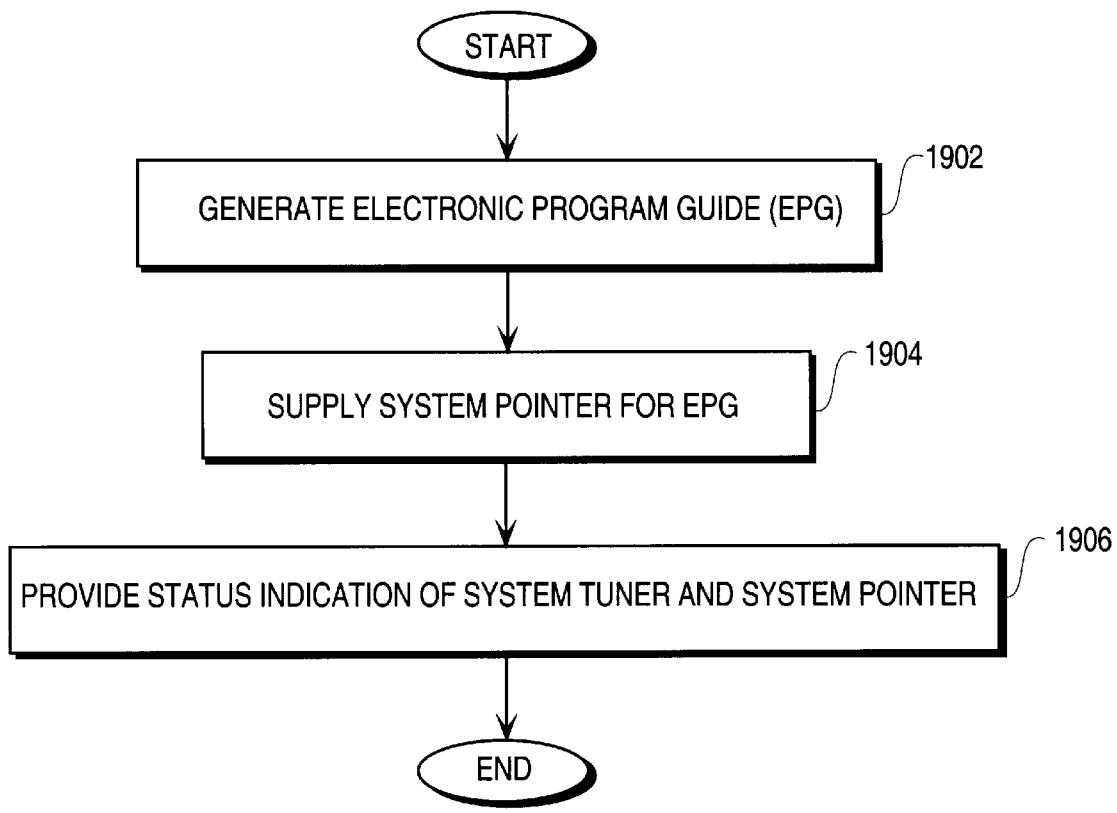
FIG. 19 is an exemplary flowchart illustrative of the process for providing tuner and pointer status display in one embodiment of the present invention.

In the channel surfing mode the user may manipulate the system pointer to a program or channel in the electronic program guide that is different from the program or channel currently being broadcast. For this reason, it is preferred that the broadcast system provides in the electronic program guide an indication to the user as to the status of the broadcast system tuner and the system pointer. However, the status indication is not required to operate the channel surfing mode in accordance with the teachings of the present invention. FIG. 19 is an exemplary flowchart illustrative of the process for providing tuner and pointer status display in one embodiment of the present invention. An electronic program guide is generated at Block 1902. At Block 1904, a system pointer is supplied for the electronic program guide. Operation continues at Block 1906, at which a status indication is provided of the system tuner and the system pointer.

Each program displayed in the electronic program guide is displayed in a program block or area that is associated with a particular channel and a particular time slot. The status indication is provided by controlling the appearance of the program block in accordance with the location of the system pointer and the channel to which the system is tuned. In particular, when the broadcast system is tuned to a program, and therefore the broadcast window displays the programming of the channel the system is tuned to, the corresponding program block is displayed on the electronic program guide as appearing to be depressed into the screen.

The program blocks of the remaining programs not broadcasted but shown in the electronic program guide appear to be protruding from the screen. Therefore, when the broadcasting system is not tuned to a program the corresponding program block is displayed on the electronic program guide as appearing to be protruding from the screen. The status indication of the system pointer causes a different effect. In particular, when the system pointer is pointing to a program the corresponding program block is displayed as highlighted on the electronic program guide. When the system pointer is not pointing to a program the corresponding program block is displayed as not highlighted on the electronic program guide.

There are four primary combinations of the status indications as used by an embodiment of the broadcast system of the present invention. First, the display of a program block appears depressed into the screen and highlighted to indicate that the broadcast system is tuned to the corresponding program and the system pointer is pointing to the corresponding program. Second, the display of a program block appears depressed into the screen and unhighlighted to indicate that the broadcast system is tuned to the corresponding program while the system pointer is pointing to a different program. Third, the display of a program block appears protruding from the screen and highlighted to indicate that the system pointer is pointing to the corresponding program while the broadcast system is tuned to a different program. Fourth, the display of a program block appears protruding from the screen and unhighlighted to indicate that the broadcast system is not tuned to the corresponding program and the system pointer is not pointing to the corresponding program.

FIG. 13 illustrates a tuner and pointer status display in one embodiment of the present invention. The broadcast system of FIG. 13 is tuned to the National Geographic Explorer program on the TBS network as indicated by the corresponding program block 1380 appearing to be depressed into the screen. The system pointer is also pointing to the National Geographic Explorer program as indicated by the highlighting of program block 1380.

Figure 20:
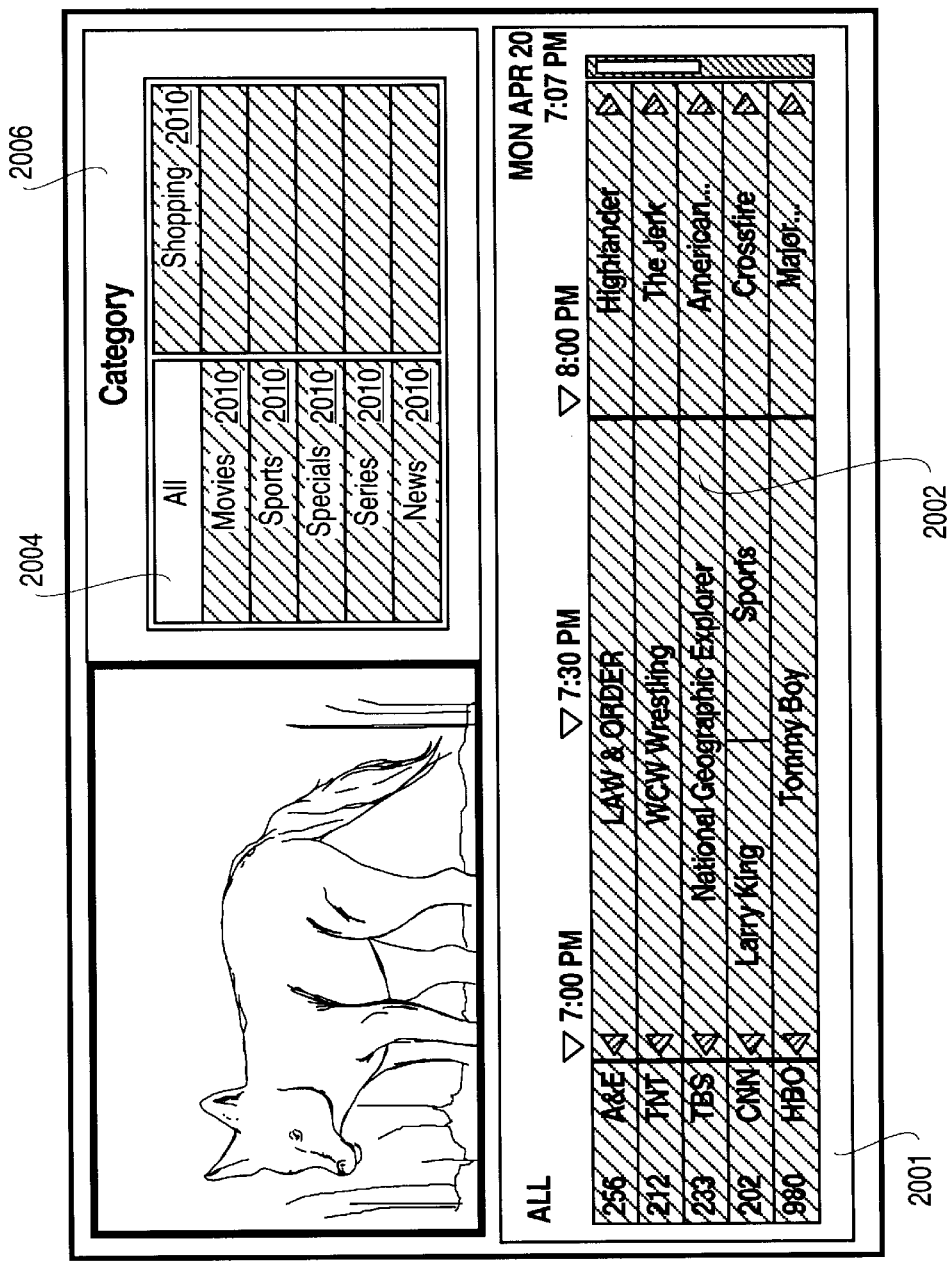
FIG. 20 illustrates the display of an electronic program guide in one embodiment of the present invention.

FIG. 20 illustrates the situation in which a broadcast system is tuned to one channel and the system pointer is pointing somewhere other than to the channel which is tuned. In particular, the broadcast system of FIG. 20 is tuned to the National Geographic Explorer program on the TBS network as indicated by the corresponding program block 2002 appearing to be depressed into the screen. An electronic category guide is selected for display instead of a display information packet. The system pointer is pointing to the "ALL" category box 2004 in the electronic category guide as indicated by the highlighting of the category block 2004.

As shown in FIG. 20, instead of selecting a display information packet for display at Block 1806 of FIG. 18, the user may select an electronic category guide 2006 for display with the electronic program guide 2001. The electronic category guide 2006 includes a number of programming categories 2010. The broadcast system then identifies programs on channels that correspond to each category 2010 contained in the electronic category guide 2006. The programs that correspond to the particular categories of the electronic category guide 2006 are then indicated or highlighted on the electronic program guide 2001. The system pointer may be manipulated by the user to an area of the electronic category guide 2006, and system pointer status is indicated. When the system pointer is pointing to a category block the category block is displayed as highlighted on the electronic category guide 2006. The system pointer is pointing to the "ALL" category block 2004 in the electronic category guide 2006 as indicated by the highlighting of category block 2004.

Figure 21:
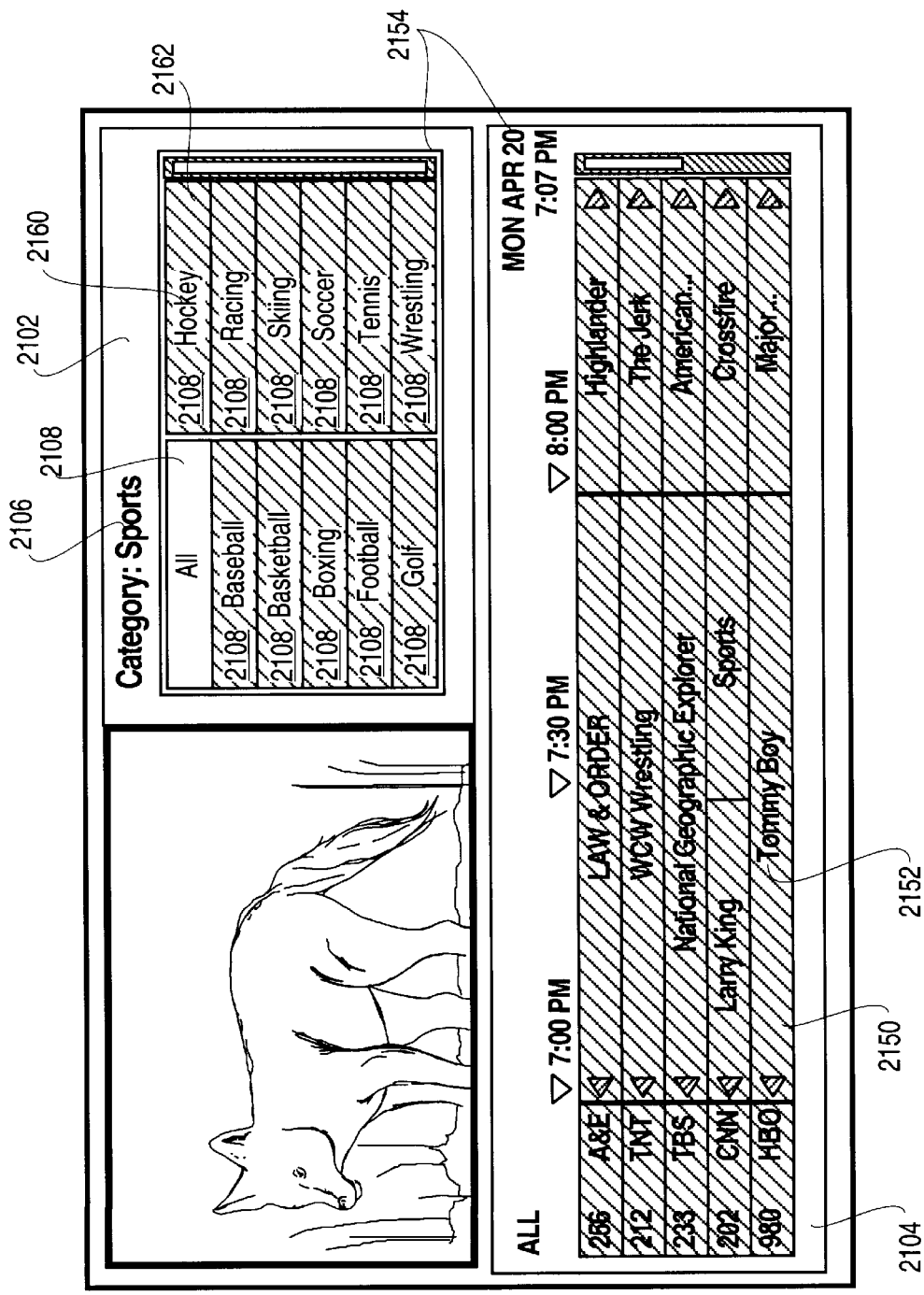
FIG. 21 illustrates the display of an electronic subcategory guide with an electronic program guide in one embodiment of the present invention.

If the user, typically using the broadcast system remote control, selects one of the categories from the electronic category guide, then the display of the electronic category guide is replaced with a display of an electronic subcategory guide. FIG. 21 illustrates the display of an electronic subcategory guide 2102 with an electronic program guide 2104 in one embodiment of the present invention. The selected category 2106 is displayed along with the electronic subcategory guide 2102 and the electronic program guide 2104. The electronic subcategory guide 2102 includes a number of subcategories 2108. The broadcast system identifies programs on channels that correspond to each subcategory contained in the electronic subcategory guide 2102. The programs that correspond to the particular categories of the electronic subcategory guide 2102 are indicated or highlighted on the electronic program guide. The status of the system pointer is shown and changed as the pointer is moved about the display. For example, the system pointer may be manipulated by the user to an area of the electronic subcategory guide 2102. When the system pointer is pointing to a subcategory block the subcategory block is displayed as highlighted on the electronic category guide. In FIG. 21, he system pointer is pointing to the "ALL" subcategory block 2108 in the electronic subcategory guide 2102 as indicated by the highlighting of subcategory block 2108.

The multiple channel broadcasting system of one embodiment of the present invention provides a user with several options regarding the programs available for broadcast. The multiple channel broadcasting system allows the user to select pay-per-view broadcasts for purchase. In addition, the broadcast system allows the user to select corresponding programs for recording. Furthermore, the multiple channel broadcasting system allows the user to set a broadcasting system timer to automatically tune the broadcasting system to a program at a particular time. Moreover, the multiple channel broadcasting system allows the user to designate certain programs as favorite programs. Consequently, the multiple channel broadcasting system of one embodiment of the present invention displays icons that provide the user with the status of the programs while viewing the electronic program guide.

Figure 22:
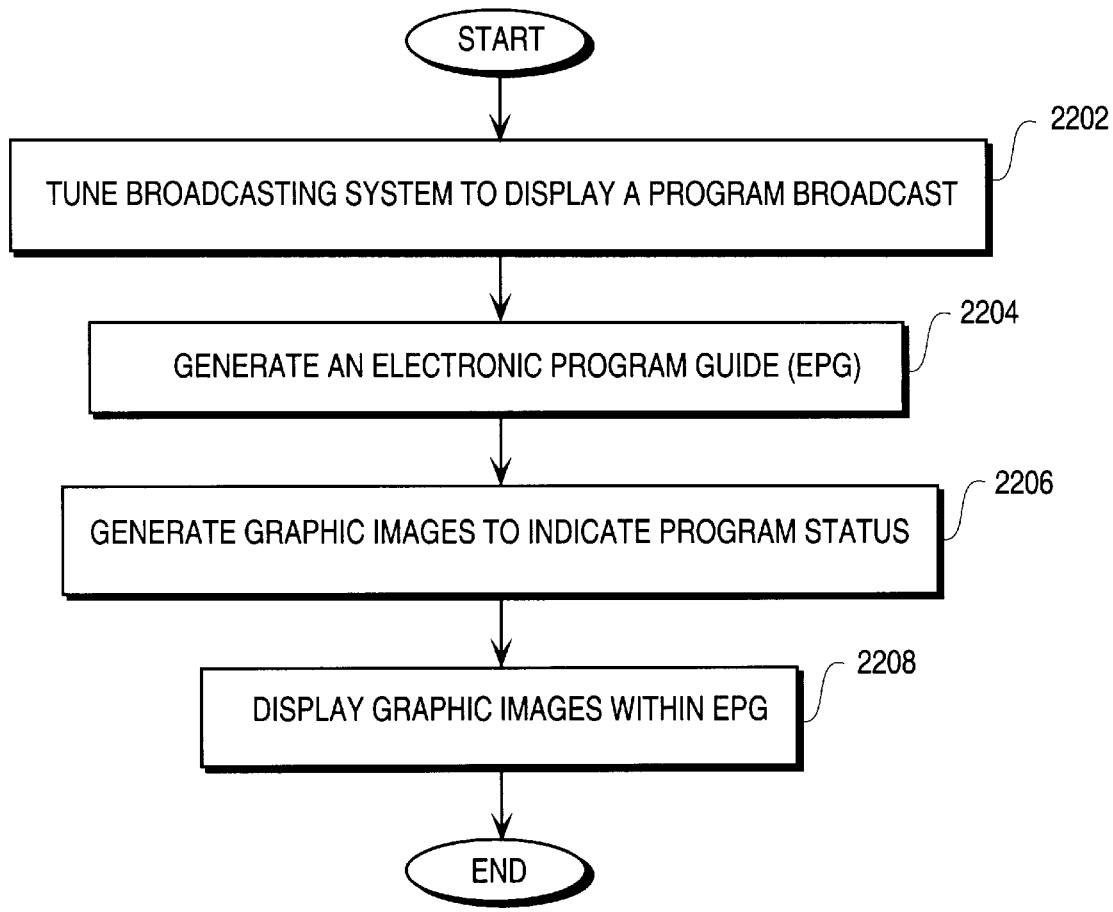
FIG. 22 is an exemplary flowchart that illustrates the process for providing an icon to indicate program status in one embodiment of the present invention.

FIG. 22 is an exemplary flowchart that illustrates the process for providing an icon to indicate program status in one embodiment of the present invention. Operation begins at Block 2202, at which the broadcasting system is tuned to display a program broadcast. Operation continues at Block 2204, at which an electronic program guide is generated. Electronic menus may be displayed along with the electronic program guide. The electronic menus control pay-per-view purchases, selections of programs for recording, setting of the broadcasting system timer, and selection of favorite programs. At Block 2206, graphic images are generated that indicate program status. Operation continues at Block 2208, at which the graphic images are displayed within the electronic program guide. The icons or graphic images may serve as electronic links between the electronic program guide and a corresponding menu of the electronic menus and a display information packet.

Figure 23:
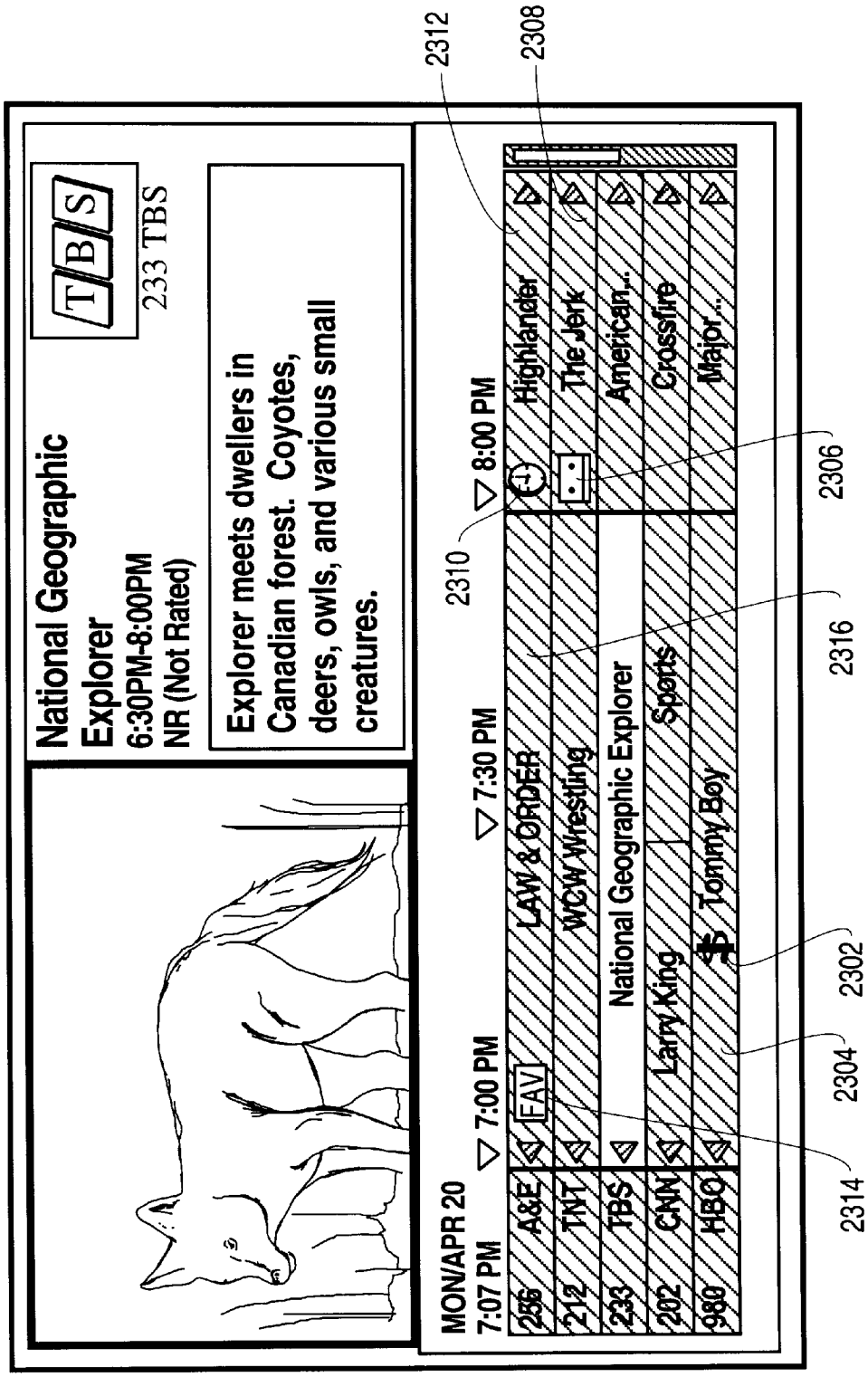
FIG. 23 illustrates the display of an electronic program guide having program status icons in one embodiment of the present invention.

FIG. 23 illustrates the display of an electronic program guide having program status icons in one embodiment of the present invention. The icon 2302 displayed in program block 2304 to indicate that a pay-per-view broadcast is selected resembles a dollar sign. The icon 2306 displayed in program block 2308 to indicate that a broadcast is selected for recording resembles a videocassette tape. The icon 2310 displayed in program block 2312 to indicate that the broadcast system timer is set to tune the broadcast system to a program at the time of the corresponding program resembles a clock. An icon may be displayed in a program block to indicate that a program is a favorite program. Icon 2314 in program block 2316 is one possible representation of a favorite program icon.

Figure 24:
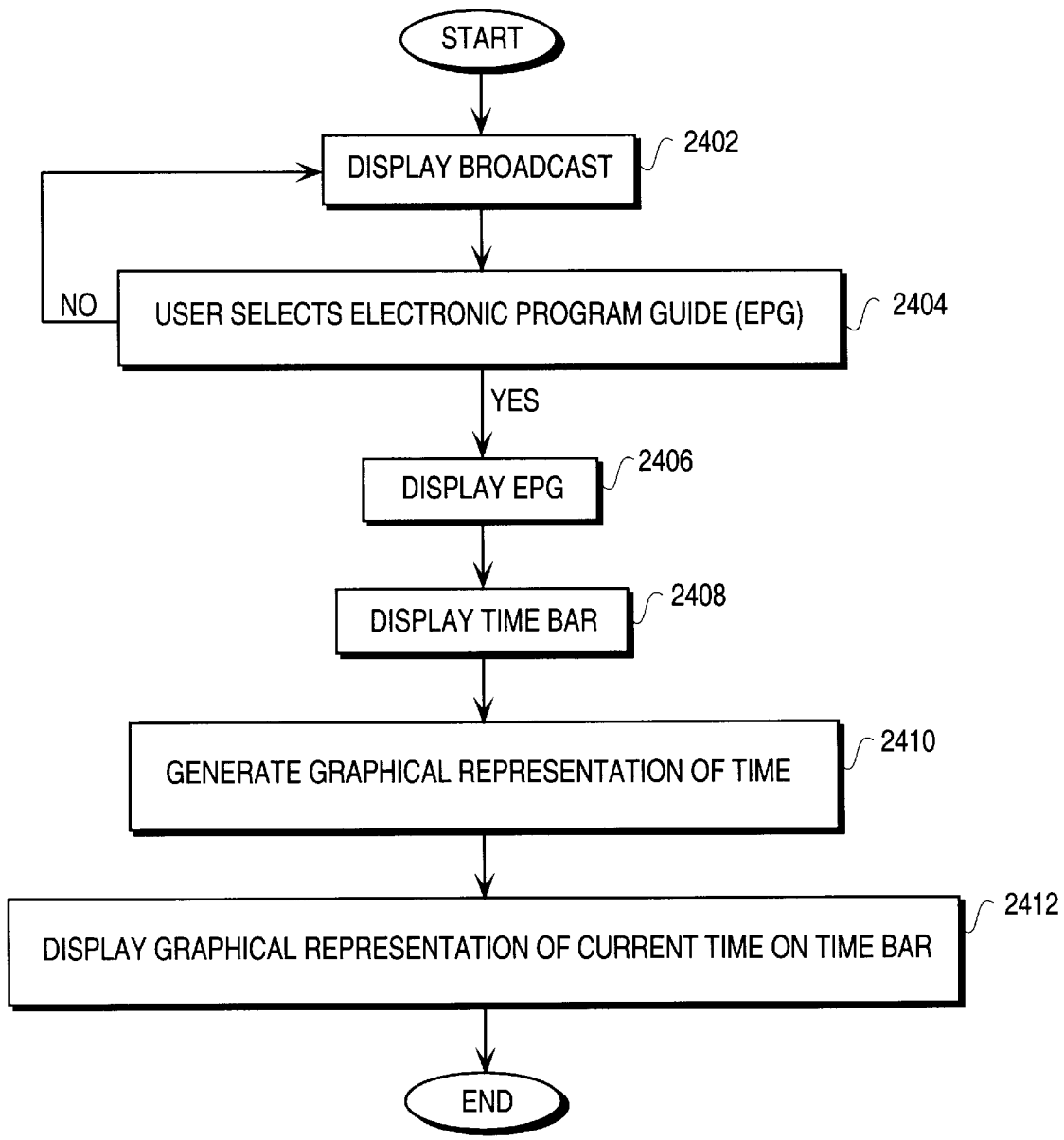
FIG. 24 is an exemplary flowchart that illustrates a process for providing a time bar with a current time marker in one embodiment of the present invention.

The multiple channel broadcasting system of one embodiment of the present invention provides a display of the time wherein a user can view the current time in relation to the times of programming and the program blocks. FIG. 24 is an exemplary flowchart that illustrates a process for providing a time bar with the current time marker in one embodiment of the present invention. Operation begins at Block 2402, at which a television screen or display is currently showing a broadcast of a selected station. Operation continues at Block 2404, at which a user may select a display of an electronic program guide. If the user does not select display of an electronic program guide operation continues at Block 2402, at which the broadcasting system continues to display the broadcast of the currently selected station. If the user selects the display of an electronic program guide, operation continues at Block 2406, at which the electronic program guide is displayed by the broadcast system.

Following display of the electronic program guide, operation continues at Block 2408, at which a time bar is displayed that identifies times of programming on the channels in the broadcasting system. Operation continues at Block 2410, at which a graphical representation of the current time is generated. Operation continues at Block 2412, at which the graphical representation of the current time is displayed in proximity to the time bar so as to indicate the current time in relation to the times of programming on the channels of the broadcast system. In one embodiment of the present invention the graphical representation of time is displayed as an inverted triangle on the time bar. The graphical representation of time may include a digital display of the current time. The graphical representation of time may also include an icon with the display of the current time.

Figure 25:
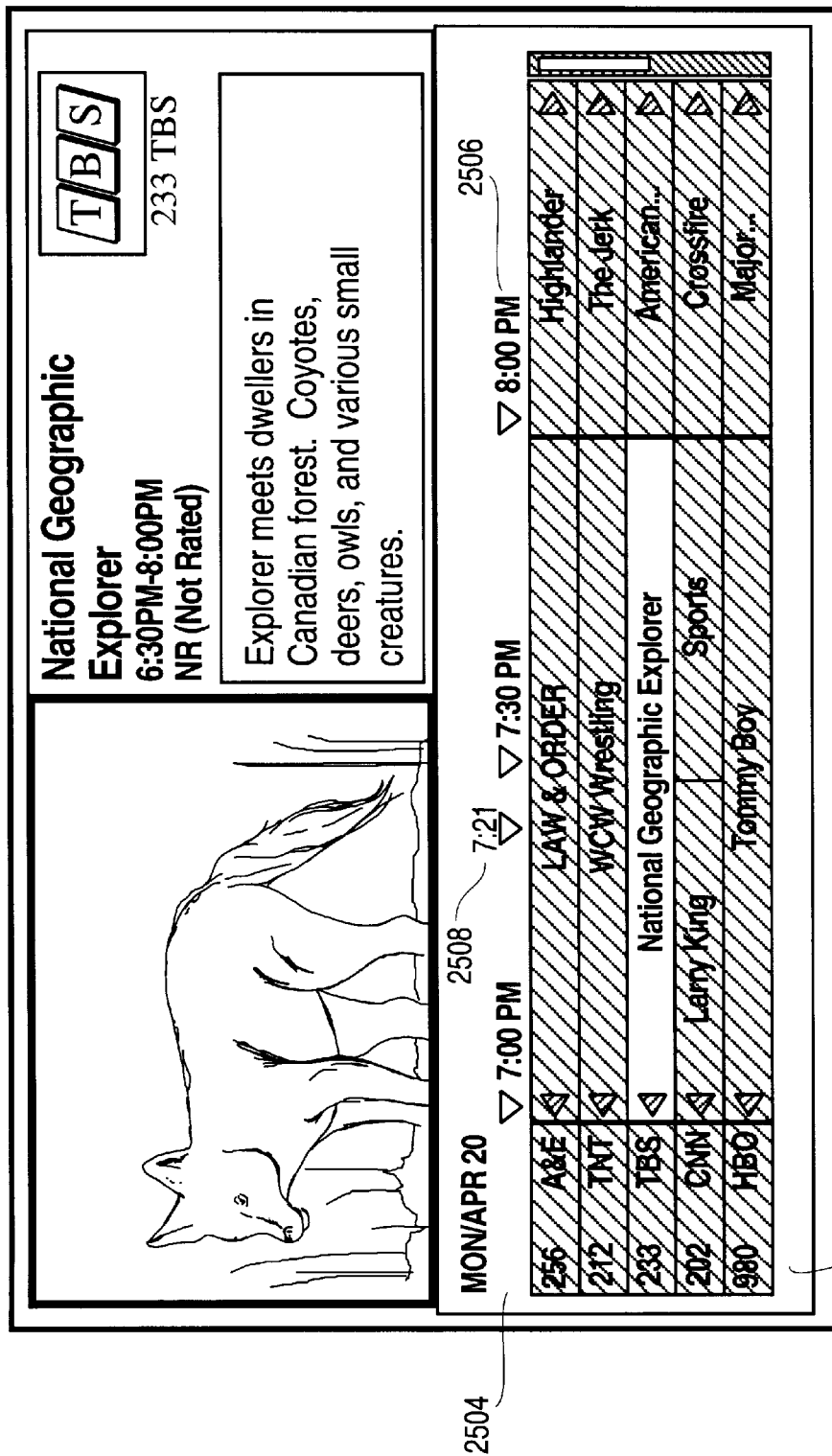
FIG. 25 illustrates the display of an electronic program guide having a graphical representation of the current time in relation to the times of channel programming in one embodiment of the present invention.

FIG. 25 illustrates the display of an electronic program guide and a graphical representation of the current time in relation to the times of channel programming in one embodiment of the present invention. When the user selects the display of an electronic program guide, the electronic program guide 2502 is displayed by the broadcast system. With the electronic program guide, a time bar 2504 is displayed that identifies times of programming 2506 on the channels in the broadcasting system. An embodiment of the present invention generates a graphical representation of the current time 2508. This graphical representation of the current time 2508 is displayed in proximity to the time bar 2504 so as to indicate the current time in relation to the times of programming on the channels of the broadcast system. This graphical representation of the current time 2508 is displayed as an inverted triangle on the time bar and includes a digital display of the current time.

Figure 26:
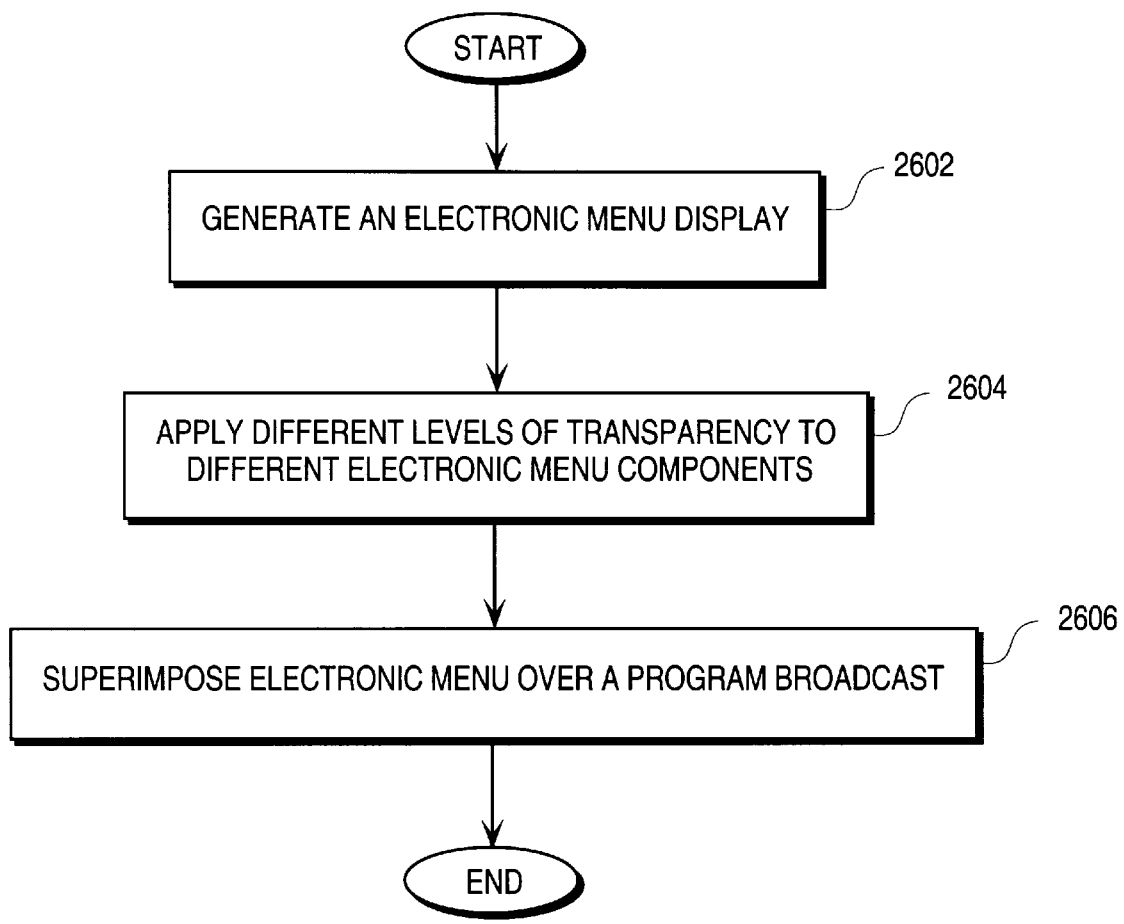
FIG. 26 is an exemplary flowchart that illustrates the process for providing an on-screen menu having differing transparency levels in one embodiment of the present invention.

In addition to the electronic program guide discussed herein, an embodiment of the multiple broadcasting system of the present invention provides an on screen menu display that enables the user to operate different functions of the system. FIG. 26 is an exemplary flowchart that illustrates the process for providing an on screen menu having differing transparency levels in one embodiment of the present invention.

In FIG. 26, operation begins at Block 2602, at which an electronic menu display is generated. The menu display comprises multiple components, multiple alphanumeric characters, and multiple icons that identify different functions of the broadcast system. Operation continues at Block 2604, at which different levels of transparency are applied to the different electronic menu components. The different levels of transparency are applied to the components so that the number of opaque components is minimized and the background is highly transparent. Operation continues at Block 2606, at which the electronic menu is superimposed over the display of a program broadcast. While the opaque components are minimized, the obstruction of the video of the broadcast by the electronic menu display is minimized. Preferably, the different transparency levels may be selected by the user.

When the user selects an electronic menu for display, then alphanumeric characters and icons are generated that identify different broadcast system functions. The user may select the transparency levels to be applied to the characters and icons of the electronic menu display. If the user does not select the transparency levels to be applied to the characters and icons of the electronic menu, then the multiple channel broadcasting system applies the least transparent level of transparency to the electronic menu icons. Furthermore, the multiple channel broadcasting system applies the least transparent level of transparency to the verbal description of the broadcasting system functions. Moreover, the multiple channel broadcasting system applies the most transparent level of transparency to the numerals of the electronic menu display.

Figure 27:
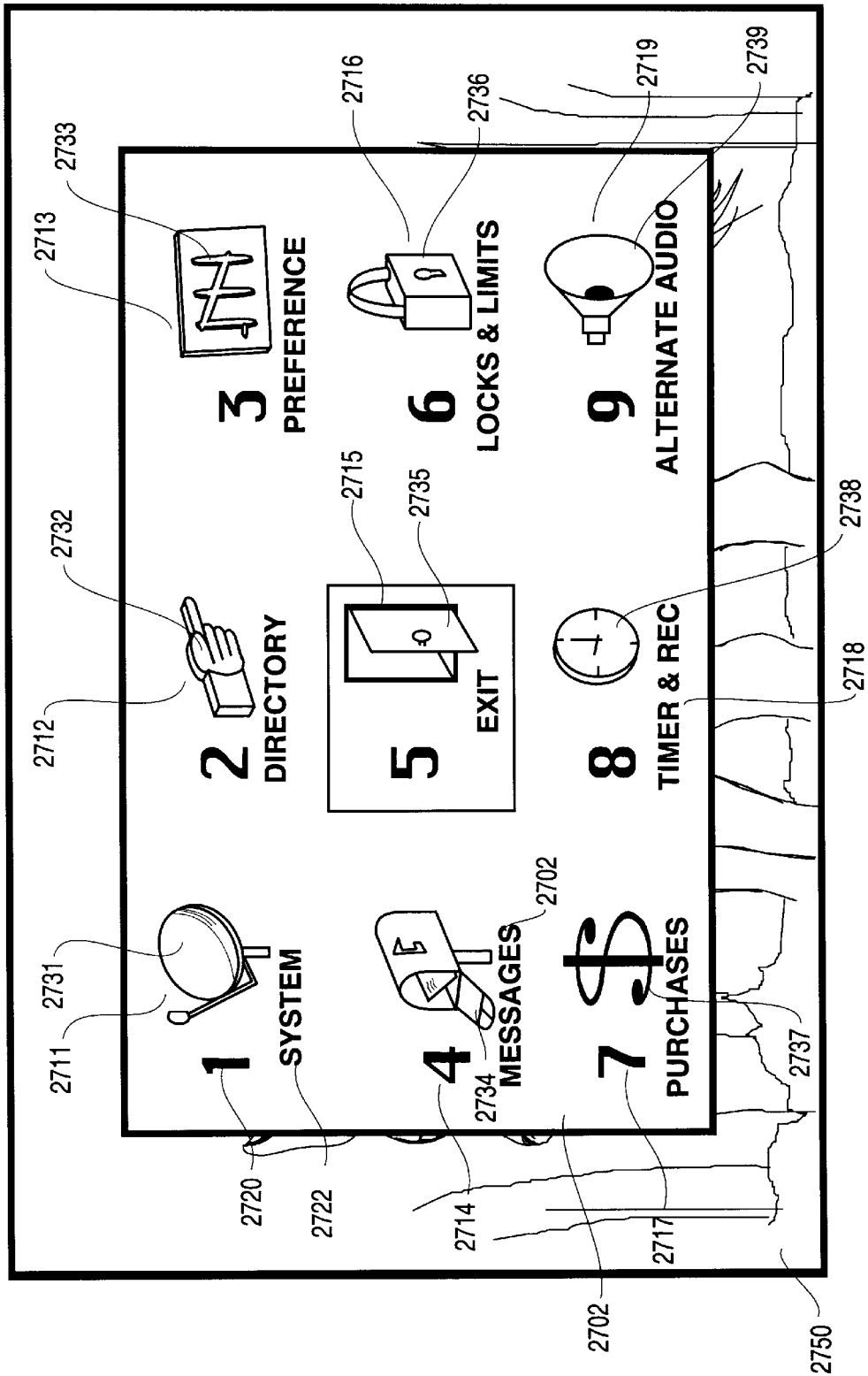
FIG. 27 illustrates the display of an on screen menu having differing transparency levels in one embodiment of the present invention.

FIG. 27 illustrates the display of an on screen menu having differing transparency levels in one embodiment of the present invention. The electronic menu display 2702 comprises multiple components 2711–2719, multiple alphanumeric characters 2720–2722, and multiple icons 2731–2739 that identify different functions of the broadcast system. Different levels of transparency are applied to the different electronic menu components. The different levels of transparency are applied to the components so that the number of opaque components is minimized and the background is highly transparent. Following generation of the electronic menu 2702, the electronic menu 2702 is superimposed over a program broadcast 2750.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a multiple channel broadcasting system in which programs are broadcasted for display on a screen, a method for generating an on-screen guide for a user to select channels to view, comprising the steps of:

tuning to a channel to provide a display of a broadcast of a program on the screen;

displaying an electronic program guide identifying channels in the broadcasting system;

translating the display of a broadcast of a program to a smaller broadcast window on the screen, said step of translating comprising the steps of superimposing at least one of a series of successively smaller broadcast window outlines over the display of the broadcast on the screen and displaying the broadcast in the smaller broadcast window; and displaying the electronic program guide along with the broadcast on the screen, such that no portion of the broadcast is covered by the electronic program guide.

2. The method as set forth in claim 1, wherein a display information packet containing a description of the program is displayed with the electronic program guide.

3. The method as set forth in claim 2, wherein an electronic category guide is displayed with the electronic program guide.

4. The method as set forth in claim 1, wherein the display information packet is selectively replaced by an electronic category guide containing a plurality of program categories.

5. The method as set forth in claim 1, wherein a first broadcast window outline of the series of successively smaller broadcast window outlines is shorter in length and narrower in width than the screen.

6. The method as set forth in claim 5, wherein a second broadcast window outline of said series of successively smaller broadcast window outlines is shorter in length and narrower in width than said first outline.

7. The method as set forth in claim 1, wherein the size of a broadcast window is not changed until the size of a smallest superimposed broadcast window outline equals a predetermined smallest broadcast window size.

8. A system comprising:
a processor configured to be coupled to a display device, said processor,
configured to control the system to tune to a channel in a multiple channel broadcasting system to provide a broadcast of a program on the display device;
configured to control the system to generate an electronic program guide identifying channels in the broadcasting system;
configured to control the system to translate the display of the broadcast of the program to a smaller broadcast window on the display device, said translation superimposing at least one of a series of successively smaller broadcast window outlines over the display of the broadcast on the display device; and
configured to control the system to display the electronic program guide along with the broadcast on the display device, such that no portion of the broadcast is covered by the electronic program guide.

9. The system as set forth in claim 8, wherein the processor is further configured to control the system to generate a display information packet containing a description of said first program.

10. The system as set forth in claim 9, wherein the processor is further configured to control the system to generate an electronic category guide containing a plurality of programming categories.

11. The system as set forth in claim 8, wherein the size of a broadcast window is not changed until the size of a smallest superimposed broadcast window outline equals said predetermined smallest broadcast window size.

12. A system for generating an on-screen guide, comprising:
a display device;
an electronic program guide displaying on the display device, said electronic program guide identifying channels in a multiple channel broadcasting system;
a broadcast of a program displayed on the display device; and
a controller that translates the broadcast from a first size to a smaller second size when the electronic program guide is displayed by superimposing at least one of a series of successively smaller broadcast window outlines over the display of the broadcast on the screen.

13. The system as set forth in claim 12, further comprising a display information packet containing a description of the first program, the display information packet displayed along with the electronic program guide.

14. The system as set forth in claim 13, wherein said display information packet is selectively replaced by an electronic category guide containing a plurality of programming categories.

15. The system as set forth in claim 14, wherein the size of a broadcast window is not changed until the size of a smallest superimposed video broadcast window outline equals a predetermined smallest video broadcast window size.

16. A computer readable medium containing executable instructions which, when executed in a processing system, causes the system to perform the steps for generating an on-screen guide for a user to select channels in a multiple channel broadcasting system comprising:
tuning to a channel to provide a display of a broadcast of a program on a display;
generating an electronic program guide identifying channels in the broadcasting system;
translating the display of the broadcast of the program to a smaller broadcast window on the screen, said step of translating comprising the steps of superimposing at least one of a series of successively smaller broadcast window outlines over the display of the broadcast on the screen and displaying the broadcast in the smaller broadcast window; and
displaying the electronic program guide along with the broadcast on the screen, such that no portion of the broadcast is covered by the electronic program guide.

17. The computer readable medium as set forth in claim 16, wherein a display information packet containing a description of said first program is displayed with the electronic program guide.

18. The computer readable medium as set forth in claim 17, wherein an electronic category guide containing a plurality of programming categories is displayed with the electronic program guide.

19. The computer readable medium as set forth in claim 16, wherein the size of a broadcast window is not changed until the size of a smallest superimposed video broadcast window outline equals a predetermined smallest video broadcast window size.

20. In a multiple channel broadcasting system which displays a first window containing a broadcast of a program and a second window containing programming information, a method for removing the programming information from a display, comprising the steps of:
translating the broadcast of a program displayed in the first window to a larger window on the display by superimposing at least one of a series of successively larger video window outlines over the screen;
removing the display of said programming information from said display;
displaying said video of a broadcast in the area of the largest video window outline.

21. The method as set forth in claim 20, wherein the step of removing the display of the programming information is performed prior to the step of translating.

22. The method as set forth in claim 20, wherein the step of translating is performed prior to the step of removing the display of the programming information.

23. The method as set forth in claim 20, wherein the programming information comprises an electronic program guide.

24. The method as set forth in claim 23, wherein the programming information includes a display information packet.

25. The method as set forth in claim 23, wherein the programming information includes an electronic category guide.

26. The method as set forth in claim 20, wherein a first outline of said series of successively larger video window outlines is longer in length and wider in width than the first broadcast window.

27. The method as set forth in claim 26, wherein a second outline of said series of successively larger video window outlines is longer in length and wider in width than said first outline.

28. The method as set forth in claim 20, wherein said step of translating redisplays the video broadcast in an area defined by each successively larger broadcast window outline.

29. A system comprising:
    a processor configured to be coupled to a display device, said processor,
        configured to control the system to tune to a channel in a multiple channel broadcasting system to provide a broadcast of a program on said display device in a first window on the display;
        configured to control the system to generate programming information identifying channels in the broadcasting system;
        configured to control the system to translate video of the broadcast of a program to a smaller broadcast window on the display device, said translation superimposing at least one of a series of successively smaller broadcast window outlines over the broadcast on the display device;
        configured to control the system to display the programming information along with the translated broadcast on the display device.

30. The system as set forth in claim 29, wherein the programming information is an electronic program guide.

31. The system as set forth in claim 30, wherein the programming information includes a display information packet, the display information packet containing a description of said first program.

32. The system as set forth in claim 30, wherein the programming information includes an electronic category guide, the electronic category guide containing a plurality of programming categories.

33. The system as set forth in claim 29, wherein the programming information is removed from the display device, said processor,
    configured to control the system to translate video of a broadcast of a program displayed in the smaller broadcast window to a larger broadcast window on the display device by superimposing at least one of a series of successively larger broadcast window outlines over the display device;
    configured to control the system to remove the display of the programming information from said display device;
    configured to control the system to display the video of the broadcast in the area of the largest broadcast window outline.

34. The computer system as set forth in claim 33, wherein the processor controls the system to remove the display of the programming information prior to translating the video of a broadcast of a program.

35. The computer system as set forth in claim 33, wherein the processor controls the system to translate the video of a broadcast of a program prior to removing the display of the programming information.

* * * * *